United States Patent
Choi et al.

(10) Patent No.: US 11,216,184 B2
(45) Date of Patent: Jan. 4, 2022

(54) NON-VOLATILE MEMORY WITH ON-CHIP PRINCIPAL COMPONENT ANALYSIS FOR GENERATING LOW DIMENSIONAL OUTPUTS FOR MACHINE LEARNING

(71) Applicant: Western Digital Technologies, Inc., San Jose, CA (US)

(72) Inventors: Won Ho Choi, Santa Clara, CA (US); Yongjune Kim, San Jose, CA (US); Martin Lueker-Boden, Fremont, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 24 days.

(21) Appl. No.: 16/706,618

(22) Filed: Dec. 6, 2019

(65) Prior Publication Data

US 2021/0173560 A1   Jun. 10, 2021

(51) Int. Cl.
*G06F 3/06*          (2006.01)
*G06F 11/10*        (2006.01)
(Continued)

(52) U.S. Cl.
CPC .......... *G06F 3/0604* (2013.01); *G06F 3/0659* (2013.01); *G06F 3/0679* (2013.01);
(Continued)

(58) Field of Classification Search
CPC .... G06F 3/0604; G06F 3/0659; G06F 3/0679; G06F 11/1068; G06N 3/04; G06N 3/08; G06N 3/10
See application file for complete search history.

(56) References Cited

U.S. PATENT DOCUMENTS 7,457,749 B2    11/2008  Burges et al.
2008/0319712 A1*  12/2008  Claps .................. G01N 21/359
                                                          702/189

(Continued)

FOREIGN PATENT DOCUMENTS

CN      108629409 A       4/2018
CN      108629410 A       4/2018
WO      2020078470 A1     10/2018

OTHER PUBLICATIONS

International Search Report and Written Opinion for International Application No. PCT/US2020/038773, dated Aug. 30, 2020, 9 pages.

(Continued)

*Primary Examiner* — Guy J Lamarre
(74) *Attorney, Agent, or Firm* — Loza & Loza, LLP; Gabriel Fitch

(57) ABSTRACT

Methods and apparatus are disclosed for implementing principal component analysis (PCA) within a non-volatile memory (NVM) die of solid state drive (SSD) to reduce the dimensionality of machine learning data before the data is transferred to other components of the SSD, such as to a data storage controller equipped with a machine learning engine. The machine learning data may include, for example, training images for training an image recognition system in which the SSD is installed. In some examples, the on-chip PCA components of the NVM die are configured as under-the-array or next-to-the-array components. In other examples, one or more arrays of the NVM die are configured as multiplication cores for performing PCA matrix multiplication. In still other aspects, multiple NVM dies are arranged in parallel, each with on-chip PCA components to permit parallel concurrent on-chip processing of machine learning data.

24 Claims, 17 Drawing Sheets

(51) Int. Cl.
*G06N 3/08* (2006.01)
*G06N 3/10* (2006.01)
*G06N 3/04* (2006.01)

(52) U.S. Cl.
CPC ........... *G06F 11/1068* (2013.01); *G06N 3/04* (2013.01); *G06N 3/08* (2013.01); *G06N 3/10* (2013.01)

(56) References Cited

U.S. PATENT DOCUMENTS

| | | | |
|---|---|---|---|
| 2016/0029027 A1 | 1/2016 | Katamaneni et al. | |
| 2016/0345009 A1 | 11/2016 | Zhong et al. | |
| 2017/0045356 A1* | 2/2017 | Pandev | G01B 21/042 |
| 2018/0075344 A1 | 3/2018 | Ma et al. | |
| 2018/0150052 A1* | 5/2018 | Cherian | G05B 13/027 |
| 2018/0267810 A1* | 9/2018 | Madpur | G06F 1/04 |
| 2018/0315159 A1* | 11/2018 | Ould-Ahmed-Vall | G06N 3/063 |
| 2019/0004734 A1* | 1/2019 | Kirshenbaum | G06F 3/0659 |
| 2019/0198114 A1* | 6/2019 | Ben-Rubi | G06F 11/1068 |
| 2019/0347522 A1* | 11/2019 | Nir | G06K 9/6257 |

OTHER PUBLICATIONS

Leibin Ni, et al; "Distributed In-Memory Computing on Binary RRAM Crossbar;" ACM Journal on Emerging Technologies in Computing Systems; 2017; 19 pages <http://hdl.handle.net/10220/43796>.

Suhas Jayaram Subramanya, et al; "BLAS-on-flash : An Efficient Alternative for Large Scale ML Training and Inference?" Last Accessed: Dec. 4, 2019; 15 pages <https://www.microsoft.com/en-US/research/uploads/prod/2018/06/main-5b59716a59e37.pdf>.

Mohsen Imani, et al; "Ultra-Efficient Processing In-Memory for Data Intensive Applications;" CSE Department; UC San Diego; La Jolla, CA 92093, USA; Last Accessed: Dec. 4, 2019; 6 pages <http://moimani.weebly.com/uploads/2/3/8/6/23860882/dac17-pim_multiplication.pdf>.

Ping Chi, et al; "Prime: A Novel Processing-in-memory Architecture for Neural Network Computation in ReRAM-based Main Memory;" ACM/IEEE 43rd Annual International Symposium on Computer Architecture; 2016; 13 pages <https://seal.ece.ucsb.edu/sites/default/files/publications/prime_isca_2016.pdf>.

Hyeokjun Choe, et al.; "Near-Data Processing for Machine Learning;" Conference paper at ICLR 2017; 12 pages <https://openreview.net/pdf?id=H1_EDpogx>.

Uday A Korat; "A Reconfigurable Hardware Implementation for the Principal Component Analysis;" Thesis paper; San Diego State University; Fall 2016; 73 pages <https://sdsu-dspace.calstate.edu/bitstream/handle/10211.3/187401/Korat_sdsu_0220N_11604.pdf?sequence=1 >.

Vaclav Hlavac; "Principal Component Analysis (PCA) Application to images;" Czech Technical University; Prague Last Accessed: Dec. 4, 2019; 26 pages <http://people.ciirc.cvut.cz/~hlavac/TeachPresEn/11ImageProc/15PCA.pdf>.

\* cited by examiner

NON-VOLATILE MEMORY WITH ON-CHIP PRINCIPAL COMPONENT ANALYSIS FOR GENERATING LOW DIMENSIONAL OUTPUTS FOR MACHINE LEARNING

FIELD

The disclosure relates, in some embodiments, to non-volatile memory (NVM) dies. More specifically, but not exclusively, the disclosure relates to methods and apparatus for implementing principal component analysis within an NVM die for use with machine learning.

INTRODUCTION

Machine learning generally relates to the use of artificial intelligence to perform tasks without explicit instructions and instead relying on learned patterns and applying such learning for inference. Deep learning (which also may be referred to as deep structured learning or hierarchical learning) relates to machine learning methods based on learning data representations or architectures, such as deep neural networks (DNNs), rather than to task-specific procedures or algorithms. Machine learning systems may need to be trained using initial training data, such as an initial set of images that have been labeled for use in training an image recognition system. A suitably-trained DNN may then be used to recognize or distinguish particular input images to facilitate computer vision or the like.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of the disclosure provides a memory die that includes: a non-volatile memory (NVM) array; a principal component analysis (PCA) component configured in the memory die to process input data stored within the NVM array memory die to generate PCA output data; and an output device configured to output the PCA output data from the memory die.

Another embodiment of the disclosure provides a method for use with memory die having an NVM array, the method including: storing data within the NVM array; determining one or more principal components of the data using a PCA component formed within the memory die; and outputting the one or more principal components of the data from the memory die.

Yet another embodiment of the disclosure provides an apparatus that includes: means, formed on a memory die having an NVM array, for performing PCA on data obtained from the NVM array to determine principal components of the data; and means, formed on the memory die, for outputting principal components of the data from the memory die.

Still yet another embodiment of the disclosure provides a data storage device that includes: a storage device controller; a memory array comprising a plurality of memory dies; wherein at least one of the memory dies comprises an NVM array; a PCA component in the at least one of the memory dies and configured to process input data obtained from the NVM array to generate PCA output data; and an output device configured to output the PCA output data to the storage device controller.

DETAILED DESCRIPTION

Figure 1:
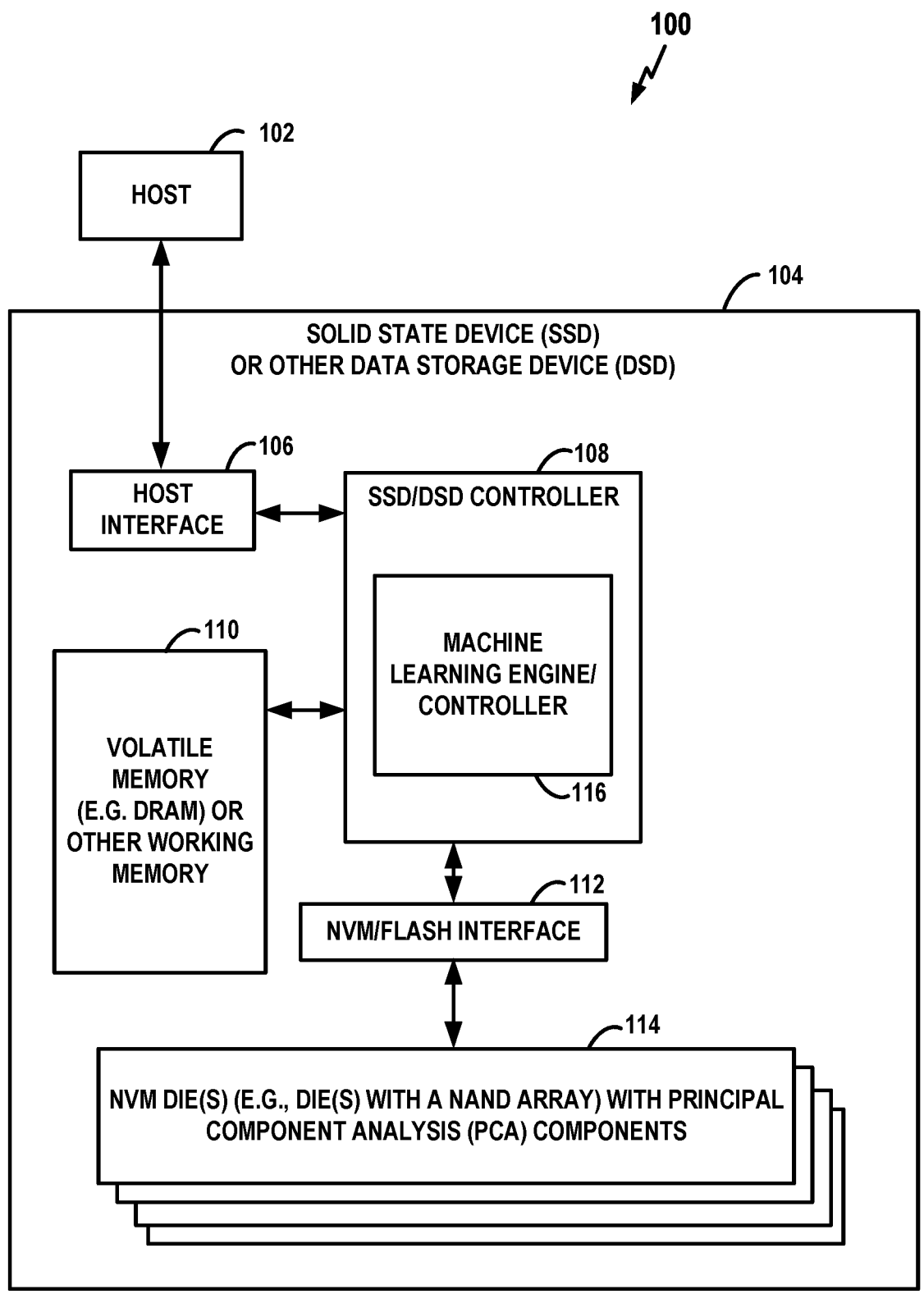
FIG. 1 is a schematic block diagram illustrating a data storage device in the form of an exemplary solid state drive (SSD) having an NVM die configured with on-chip PCA components.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The examples herein relate to non-volatile memory (NVM) arrays, and to data storage devices or apparatus for controlling the NVM arrays, such as a controller of a data storage device (such as an SSD), and in particular to solid-state memory storage devices such as those that use NAND flash memory (herein "NANDs"). (A NAND is a type of non-volatile storage technology that does not require power to retain data. It exploits negative-AND logic, i.e. NAND logic.) For the sake of brevity, an SSD having one or more NAND dies will be used as a non-limiting example of a data storage device (DSD) below in the description of various embodiments. It is understood that at least some aspects described herein may be applicable to other forms of data storage devices as well. For example, at least some aspects described herein may be applicable to phase-change memory (PCM) arrays, magneto-resistive random access memory (MRAM) arrays and resistive random access memory (ReRAM) arrays. In addition, the various embodiments may be used in various machine learning devices which may include some combination of processing elements and memory/data storage elements, including the NVM arrays constructed/configured in accordance with the described embodiments.

Overview

Machine learning systems or other embedded statistical inference systems may be installed within battery-powered mobile devices (such as smart phones), wearable devices (such as smart watches or smart glasses), aerial drones or other portable devices. Power resources may be limited within such devices, imposing significant energy constraints on the machine learning system. As noted above, machine learning systems may need to be trained using initial training data, such as a set of known images for training an image recognition system. Training can consume considerable power, especially since large quantities of training data may need to be transferred from one storage device (such as an NVM device) to a working memory (such as a volatile memory such as dynamic random access memory (DRAM) or a non-volatile memory suitable for fast access), and then held in the such memory to facilitate the training procedure and the creation of deep neural networks (DNNs). For the purpose of simplicity of description, DRAM will be used as the primary and non-limiting example of such working memory in the illustration of various embodiments.

Generally speaking, the more complex the training dataset, the more energy is required to train the system. The complexity of the dataset may be represented in terms of its dimensionality. Considerable energy may be consumed if a complex training dataset with high dimensionality is transferred from an NVM to the working memory of a device and then retained in that volatile memory for processing by a machine learning processor coupled to the working memory. For battery-powered devices, in particular, the resulting power consumption can be prohibitive.

Principal component analysis (PCA) refers to statistical procedures that employ orthogonal transformations to convert correlated data into linearly uncorrelated values that represent the principal components of the data. PCA may be used to pre-process training images to facilitate machine learning or for other purposes. For example, PCA may be used to reduce a dimensionality of an input training set of images to facilitate training of a machine learning system.

In machine learning, "dimensionality" refers to the number of features (i.e. random variables) in a dataset. "Dimensionality reduction" or "dimension reduction" is generally regarded as a process of reducing a number of random variables under consideration within, e.g., a machine learning system by obtaining or computing a set of principal variables. PCA is a linear technique for dimensionality reduction that performs a linear mapping of data from a higher-dimensional space to a lower-dimensional space using techniques such that a variance of the data in the low-dimensional representation is maximized (or at least significantly increased). In this regard, PCA may be defined mathematically as an orthogonal linear transformation that transforms data to a new coordinate system so that a greatest variance (by some projection of the data) lies on a first coordinate ("the first principal component"), the second greatest variance lies on the second coordinate, and so on. In some PCA implementations, a covariance matrix of input data is generated or otherwise constructed and then eigenvectors on the matrix are computed. Eigenvectors that correspond to the largest eigenvalues (i.e. the principal components) may then be used as the principal components to reconstruct much of the variance of the original data.

Herein, at least some methods and apparatus are disclosed for implementing machine learning systems, where PCA is performed within one or more NVM dies of a data storage device (DSD) to reduce the dimensionality of data before the data is transferred to other components the DSD, such as to a volatile dynamic random access memory (DRAM) of the DSD, for use by a machine learning engine of a data storage controller of the DSD. The data may be, for example, training data such as training images for use in training an image recognition system in which the DSD is incorporated (such as the image recognition system of an aerial drone). The PCA components of an NVM die may be referred to herein as a PCA controller or PCA circuit. (Herein, an NVM die is a die having one or more NVM arrays of storage elements, such as NAND storage blocks). In the description below, SSD will be used as a non-limiting example for DSD.

The dimensionality of the data may be reduced using PCA so as to reduce the amount of data that needs to be transferred from the NVM die(s) to the machine learning engine to reduce power consumption. As noted above, power is consumed when transferring large quantities of data from an NVM to other components of a device. Power is also consumed within a DRAM that stores the large quantities of data during machine learning. Reducing the dimensionality of the data via PCA may thus reduce power consumption associated with both data transfer and DRAM data storage.

In some aspects, the PCA components of the NVM die(s) are configured as extra-array components (e.g. under-the-array or next-to-the-array circuit components). In other aspects, one or more arrays of an NVM die are configured as multiplication cores for performing PCA matrix multiplication operations. In some examples, the NVM die(s) are configured with bypass circuitry or with other bypass components for bypassing the PCA components so that unprocessed training data or other data may be transferred from the NVM die(s) to the data storage controller. In some aspects, a "Read with PCA" command is provided for fetching data from the NVM die(s) with PCA processing, whereas an ordinary "Read" command is used for fetching data from the NVM die(s) without PCA processing (i.e. fetching while bypassing the PCA components).

The PCA components of the NVM die(s) may be configured based on the particular machine learning components that need to be trained. In some examples, the PCA components of the NVM die(s) are configured to generate eigenvalues and eigenvectors, with eigenvectors generated only for a first set of input data and with eigenvalues generated for the first set of input data and for subsequent sets of input data. The machine learning engine then saves and uses the initial set of eigenvectors with the subsequent sets of eigenvalues. (Eigenvalues are coefficients attached to eigenvectors and, in the case of PCA, the eigenvalues represent the covariance of the data. By ranking eigenvectors in order of their eigenvalues, highest to lowest, principal components are thereby arranged in order of significance.) In other examples, the PCA components of the NVM die(s) are configured to output eigenvalues only without outputting any corresponding eigenvectors. Depending on the particular configuration of the NVM die(s), page buffers may be used by the PCA components of the die(s) to facilitate PCA operations. For example, data may be transferred from an NVM array to the page buffer with PCA operations then performed using the data in the page buffer, with the resulting lower dimensional data then transferred from the page buffer to the machine learning engine of the SSD data storage controller.

Note that a DNN is an example of an artificial neural network that has multiple layers between input and output layers. A DNN operates to determine a mathematical computation or manipulation to convert the input into the output, which might be a linear or non-linear computation. For example, the DNN may work through its layers by calculating a probability of each output. Each mathematical manipulation may be considered a layer. Networks that have many layers are referred to as having deep layers, hence the term DNN. In one particular example, the DNN might be configured to identify a person within an input image by processing the bits of the input image to yield identify the particular person, i.e. the output of the DNN is a value that identifies the particular person. As noted above, the DNN may need to be trained. The NVM-based PCA procedures and apparatus described herein may be used to reduce the dimensionality of DNN training data, such as the dimensionality of a set of labeled images (where labeled images are images containing known data, e.g. an image that has already been identified as corresponding to a particular type of object), so that only the reduced dimensionality data is transferred from the NVM die(s) to other components of the SSD (or to a host device) for training the DNN.

Note also that the PCA-equipped dies described herein are different from graphics processor units (GPUs) that may perform PCA in that a GPU typically transfers high dimensional data from its NVM to a volatile memory before any PCA is performed, whereas in various examples herein, PCA is performed by the NVM dies. In some examples, as noted, the die includes extra-array logic for performing the PCA operations. Thus, in some aspects, a NVM architecture is disclosed that offloads PCA from SSD controllers or host devices and instead performs the PCA within the NVM die.

Moreover, at least some of the methods and apparatus disclosed herein exploit die parallelism. This can facilitate machine learning within SSDs that have multiple NVM dies.

Exemplary Machine Learning Systems and Procedures

FIG. 1 is a block diagram of a system 100 including an exemplary SSD having an NVM with on-chip PCA components. More specifically, the system 100 includes a host 102 and a SSD 104 (or other DSD) coupled to the host 102. The host 102 provides commands to the SSD 104 for transferring data between the host 102 and the SSD 104. For example, the host 102 may provide a write command to the SSD 104 for writing data to the SSD 104 or read command to the SSD 104 for reading data from the SSD 104. The host 102 may be any system or device having a need for data storage or retrieval and a compatible interface for communicating with the SSD 104. For example, the host 102 may a computing device, a personal computer, a portable computer, a workstation, a server, a personal digital assistant, a digital camera, or a digital phone as merely a few examples. Additionally or alternatively, the host 102 may be a system or device having a need for neural network processing, such as speech recognition systems and computer vision systems. For example, the host 102 may be a component of an aerial drone, autonomous vehicle, etc.

The SSD 104 includes a host interface 106, an SSD or DSD controller 108, a volatile memory 110 (such as DRAM or other working memory), an NVM interface 112 (which may be referred to as a flash interface), and an NVM die or dies 114 configured with on-chip PCA components and with a NAND array. The host interface 106 is coupled to the controller 108 and facilitates communication between the host 102 and the controller 108. The controller 108 is coupled to the volatile memory 110 as well as to the NVM die(s) 114 via the NVM interface 112. The host interface 106 may be any suitable communication interface, such as a Non-Volatile Memory express (NVMe) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, or the like. In some embodiments, the host 102 includes the SSD 104. In other embodiments, the SSD 104 is remote from the host 102 or is contained in a remote computing system communicatively coupled with the host 102. For example, the host 102 may communicate with the SSD 104 through a wireless communication link.

Although, in the example illustrated in FIG. 1, SSD 104 includes a single channel between controller 108 and NVM die(s) 114 via interface 112, the subject matter described herein is not limited to having a single memory channel. For example, in some NAND memory system architectures, two, four, eight or more NAND channels couple the controller and the NAND memory device, depending on controller capabilities. In any of the embodiments described herein, more than a single channel may be used between the controller and the memory die, even if a single channel is shown in the drawings. The controller 108 may be implemented in a single integrated circuit chip and may communicate with different layers of memory in the NVM die(s) 114 over one or more command channels.

The controller 108 controls operation of the SSD 104. In various aspects, the controller 108 receives commands from the host 102 through the host interface 106 and performs the commands to transfer data between the host 102 and the NVM die(s) 114. Furthermore, the controller 108 may manage reading from and writing to volatile memory 110 for performing the various functions effected by the controller and to maintain and manage cached information stored in volatile memory 110.

The controller 108 may include any type of processing device, such as a microprocessor, a microcontroller, an embedded controller, a logic circuit, software, firmware, or the like, for controlling operation of the SSD 104. In some aspects, some or all of the functions described herein as being performed by the controller 108 may instead be performed by another element of the SSD 104. For example, the SSD 104 may include a microprocessor, a microcontroller, an embedded controller, a logic circuit, software, firmware, application specific integrated circuit (ASIC), or any kind of processing device, for performing one or more of the functions described herein as being performed by the controller 108. According to other aspects, one or more of the functions described herein as being performed by the controller 108 are instead performed by the host 102. In still further aspects, some or all of the functions described herein as being performed by the controller 108 may instead be performed by another element such as a controller in a hybrid drive including both non-volatile memory elements and magnetic storage elements.

The volatile memory 110 may be any suitable memory, computing device, or system capable of storing data. For example, the volatile memory 110 may be ordinary RAM, DRAM, double data rate (DDR) RAM, static RAM (SRAM), synchronous dynamic RAM (SDRAM), a flash storage, an erasable programmable read-only-memory (EPROM), an electrically erasable programmable ROM (EEPROM), or the like. In various embodiments, the controller 108 uses the volatile memory 110, or a portion thereof, to store data during the transfer of data between the host 102 and the NVM die(s) 114. For example, the volatile memory 110 or a portion of the volatile memory 110 may be a cache memory. The NVM die(s) 114 receives data from the controller 108 via the NVM interface 112 and stores the data. The NVM die(s) 114 may be any suitable type of non-volatile memory, such as a NAND-type flash memory array die or the like. In some embodiments, volatile memory 110 may be replaced by a non-volatile memory such as MRAM, PCM, ReRAM, etc. to serve as a working memory for the overall device.

In the example of FIG. 1, the controller 108 may include hardware, firmware, software, or any combinations thereof that provide a machine learning controller 116 for use with the NVM die(s) 114 (where the machine learning controller, in some examples, may include at least some off-chip control components such as components for controlling the PCA components on the NVM die(s) 114). Although FIG. 1 shows an exemplary SSD and an SSD is generally used as an illustrative example in the description throughout, the various disclosed embodiments are not necessarily limited to an SSD application/implementation. As an example, the disclosed NVM die and associated processing components can be implemented as part of a package that includes other processing circuitry and/or components. For example, a processor may include, or otherwise be coupled with, embedded NVM and associated circuitry and/or components for machine learning that are described herein. The processor could, as one example, off-load certain machine learning tasks to the NVM and associated circuitry and/or components. As another example, the controller 108 may be a controller in another type of device and still include the machine learning controller 116 and perform some or all of the functions described herein.

Figure 2:
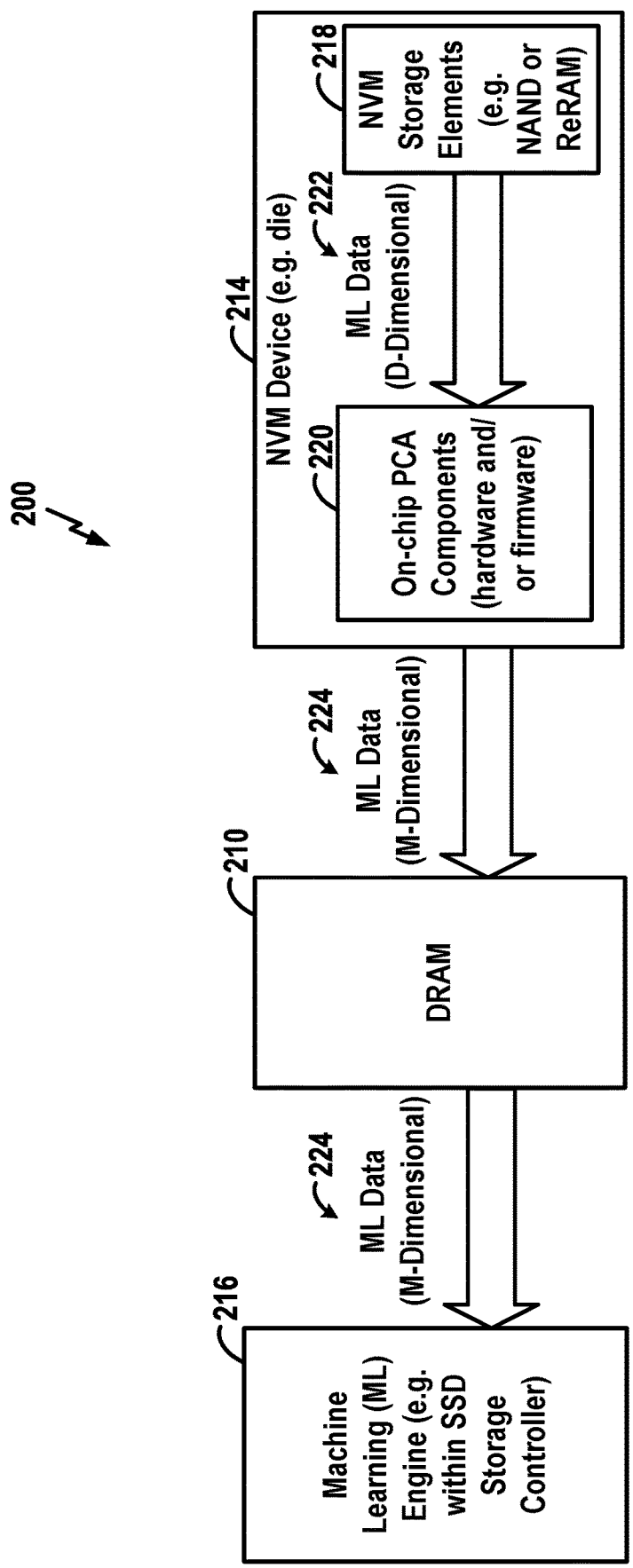
FIG. 2 is a schematic block diagram illustrating an exemplary SSD having a machine learning engine, a volatile memory, and an NVM device (e.g. an NVM die) equipped with on-chip PCA components configured in firmware or hardware.

FIG. 2 is a block diagram illustrating selected components of an exemplary SSD 200 having a machine learning engine 216 (which may be a component of a data storage controller), a DRAM 210 (which also may be a component of a data storage controller), and an NVM device 214 (which may comprise one or more NVM dies). The machine learning engine 216 may include one or more processors such as ASICs or CPUs (not shown) or may be a portion of a processor (such as an ASIC or CPU). The NVM device 214 includes, in this example, NVM storage elements 218 (such as NAND arrays or ReRAM arrays) and on-chip PCA components 220 (which may be implemented in hardware or firmware on the die as under-the-array, next-to-the-array, or other extra-array processing components formed in or on or below the die).

In the example of FIG. 2, machine learning (ML) data having D dimensions (i.e. a dimensionality of D) is stored within the NVM storage elements 218. The data may be referred to as "input" data since the data is meant for eventual input into the machine learning engine 216. The D-dimensional ML data 222 may be, for example, training data for training a DNN (not shown) associated with the machine learning engine 216. In some examples, the machine learning engine 216 is configured for image recognition and the data consists of a large set of images for training the image recognition system of the machine learning engine. The D-dimensional data 222 is transferred from the NVM storage elements 218 to the on-chip PCA components 220, which perform PCA operations to generate PCA output data, such as by converting correlated data within the input D-dimensional data 222 into linearly uncorrelated values that represent the principal components of the data. The resulting principal components (i.e. the PCA output data) may be represented as M-dimensional output data, where M is smaller than D and, typically, where M is much smaller than D, hence providing for on-chip dimensionality reduction.

In some examples, D is greater than 10,000, whereas M is less than 10. In one particular example, D is 83,781 and M is 4. Hence, a significant reduction in dimensionality is achieved within the PCA output data. Although not shown in FIG. 2, one or more page buffers may be used for temporarily storing data obtained from the NVM storage elements 218 for use during the PCA operations, such as for storing intermediate computed values. In the example of FIG. 2, the resulting M-dimensional ML data 224 is then transferred from the NVM device 214 into the DRAM 210, where it is stored, and then transferred to, or accessed as needed by, the machine learning engine 216. Although not shown in FIG. 2, the machine learning engine 216 may output data to other components of the SSD 200 or to a host (not shown). The output data may include, e.g., values representative of a trained DNN, such as suitable synaptic weights, etc.

As noted, the PCA components 220 of FIG. 2 may be configured to determine the principal components of the D-dimensional data to yield M-dimensional data using PCA. PCA thus may be used as a preprocessing technique to significantly reduce the complexity of the neural networks. PCA may achieve this goal by reducing the dimensionality of an input space after a wavelet analysis while preserving as much of the relevant information as possible.

Figure 3:
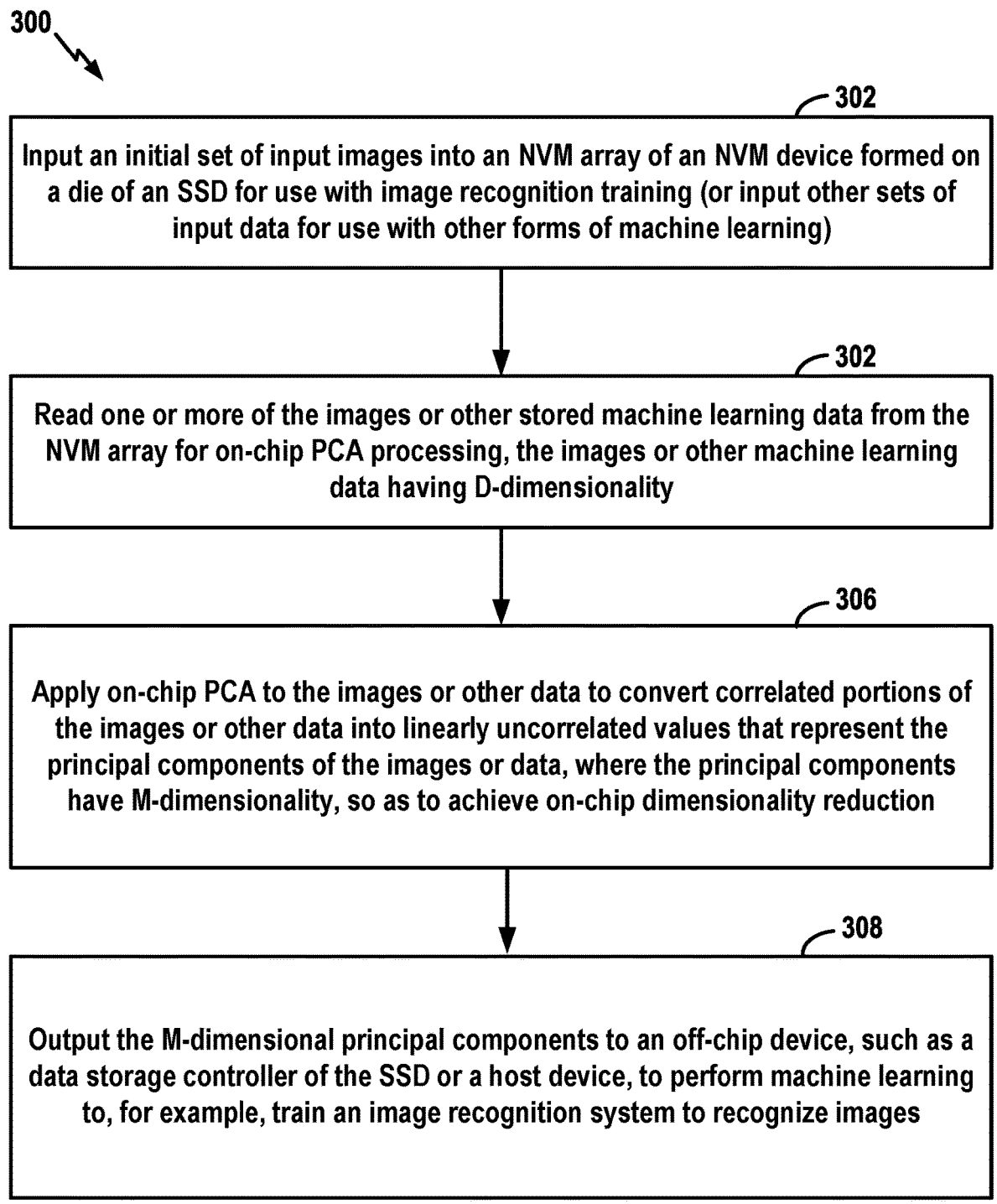
FIG. 3 is a flowchart illustrating an exemplary method that may be performed by the NVM device of FIG. 2.

FIG. 3 illustrates an exemplary method that may be performed by the NVM device 214 of FIG. 3 or other suitably-equipped devices. At 302, the NVM device (consisting of one or more dies of an SSD) inputs an initial set of input images into an NVM array of the NVM device for use with image recognition training (or inputs other sets of input data for use with other forms of machine learning). The data may be input, for example, from the data storage controller of the SSD in response to commands (e.g. write commands) issued by a host device coupled to the SSD. At 304, the NVM device reads one or more of the images or other stored machine learning data from the NVM array for on-chip PCA processing, where the images or other machine learning data have D-dimensionality. At 306, the NVM device applies on-chip PCA to the images or other data to convert correlated portions of the images or other data into linearly uncorrelated values that represent the principal components of the images or other data, where the principal components have M-dimensionality, so as to achieve the aforementioned on-chip dimensionality reduction. At 308, the NVM device outputs the M-dimensional principal components to an off-chip device, such as a data storage controller of the SSD or a host device, for performing machine learning to, for example, train an image recognition system of the host to recognize images.

In an illustrative example of FIGS. 2 and 3, the aim of the on-chip PCA is to map vectors x in a d-dimensional input space $(x_1, \ldots, x_d)$ onto vectors z in a lower M-dimensional space $(z_1, \ldots, z_M)$ in such a way that any loss of important information and data variation needed for classification (e.g. image recognition) is minimized while keeping M<d. To apply PCA to an input space vector x, the PCA components 220 of FIG. 2 may be configured to represent x as a linear combination of a set of d orthonormal vectors $u_i$ in the form, $$x = \sum_{i=1}^{d} z_i u_i \qquad (1)$$

The PCA components may be further configured to retain only a subset M<d of the basis vectors $u_i$ using $z_i$ to form $$x' = \sum_{i=1}^{M} z_i u_i + \sum_{i=M+1}^{d} b_i u_i \qquad (2)$$

where x' is the approximation to x. The remaining values $z_i$ for i≥M+1 may be replaced by constants $b_i$. The minimum of the sum of the squares of the errors may be computed using $$E_M = \frac{1}{2} \sum_{n=1}^{N} \|x^n - x'^n\|^2 \qquad (3)$$

taken over the whole data set (n=1, N), thus yielding the vector z with components $z_i$ (i=1, M), which approximates x in the M-dimensional input space.

One particular example of a hardware-based implementation of PCA that may be adapted for use within an NVM device is described in Korat et al., Circuits Syst. Signal Process (2019) 38: 2097. https://doi.org/10.1007/s00034-018-0953-y. The system described therein operates to generate eigenvalues and eigenvectors, which represent the principal components.

Figure 4:
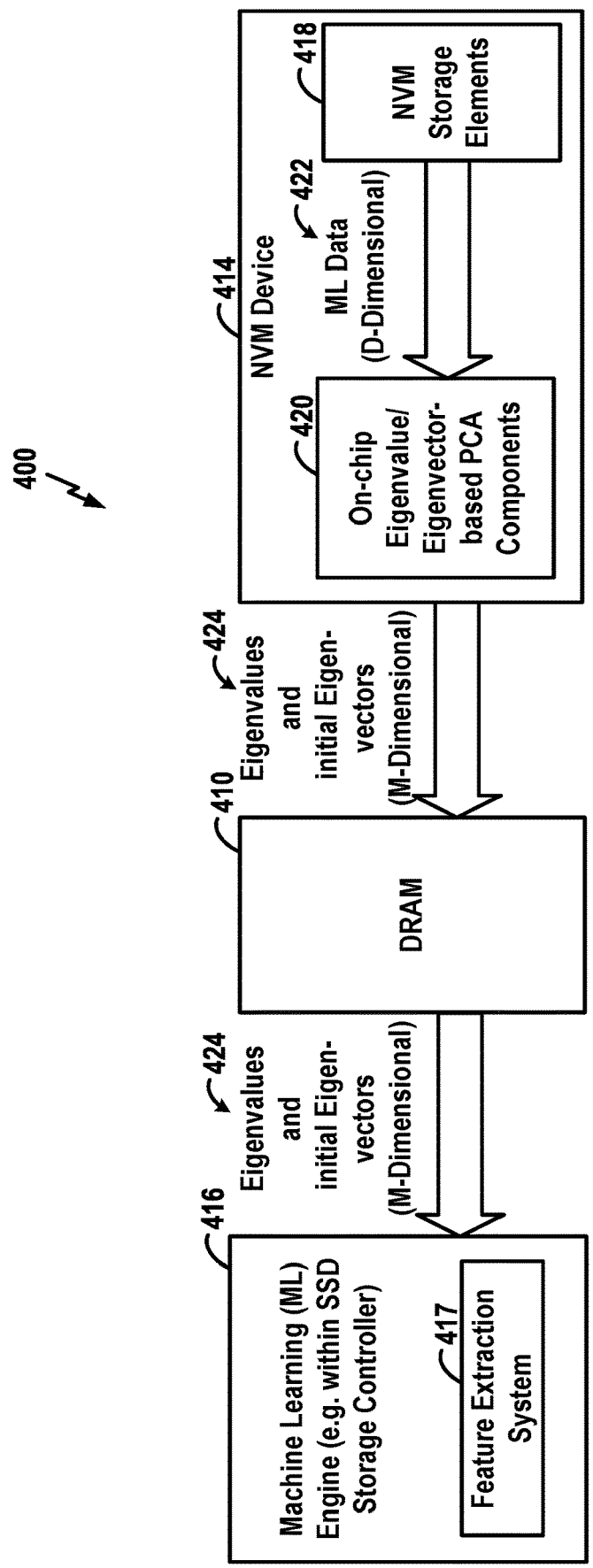
FIG. 4 is a schematic block diagram illustrating an exemplary SSD with an NVM device equipped with on-chip PCA components, where the PCA components are configured to generate eigenvalues and eigenvectors.

FIG. 4 is a block diagram illustrating selected components of an exemplary SSD 400 having an NVM device that includes on-chip components configured to perform PCA to generate eigenvalues and eigenvectors. SSD 400 again includes a machine learning engine 416, a DRAM 410, and an NVM device 414 (which may comprise one or more dies). The NVM device 414 again includes NVM storage elements 418 and PCA components 420. In the example of FIG. 4, ML data with dimension D is again stored within the NVM storage elements 418. The D-dimensional data 422 is transferred from the NVM storage elements 418 to the PCA components 420, which perform eigenvalue and eigenvector-based PCA operations to convert correlated data within the input D-dimensional data 422 into linearly uncorrelated values that represent the principal components of the data, which may be represented as M-dimensional data 424. Again, although not shown in the figure, one or more page buffers may be used for temporarily storing data during the PCA operations performed by PCA components 220, such as intermediate computed values.

In the particular example of FIG. 4, the machine learning engine 416 is configured to perform machine learning based on an initial set of eigenvalues and corresponding eigenvectors and then using subsequent sets of eigenvalues without corresponding eigenvectors. This may be regarded as a form of feature extraction. That is, in this example, the machine learning engine 416 includes a feature extraction system 417 (or is a feature extraction system). The PCA components 420 are configured to generate an initial set of eigenvectors and eigenvalues based on an initial set of D-dimensional ML data and to then generate additional eigenvalues (but not additional eigenvectors) for additional sets of data. For example, the initial set of D-dimensional ML data may include an initial set of training images from which eigenvectors and eigenvalues are generated. The additional sets of data may include additional training images from which eigenvalues are generated for use with the initial set of eigenvectors.

In the example of FIG. 4, an initial set of M-dimensional ML data 424 (consisting of eigenvalues and initial eigenvectors) is transferred from the NVM device 414 into the DRAM 410, where it is stored and then accessed as needed by the machine learning engine 416 and its feature extraction system 417 to perform initial training. Then, additional sets of M-dimensional ML data 424 (consisting of eigenvalues without eigenvectors) are transferred from the NVM device 414 into the DRAM 410, where it is stored and then accessed as needed by the machine learning engine 416 and its feature extraction system 417 to perform further training. Although not shown in FIG. 4, the machine learning engine 416 and its feature extraction system 417 may output data to other components of the SSD 400 or to a host (not shown). The output data again may include, for example, values representative of a trained DNN, such as synaptic weights or the like.

Figure 5:
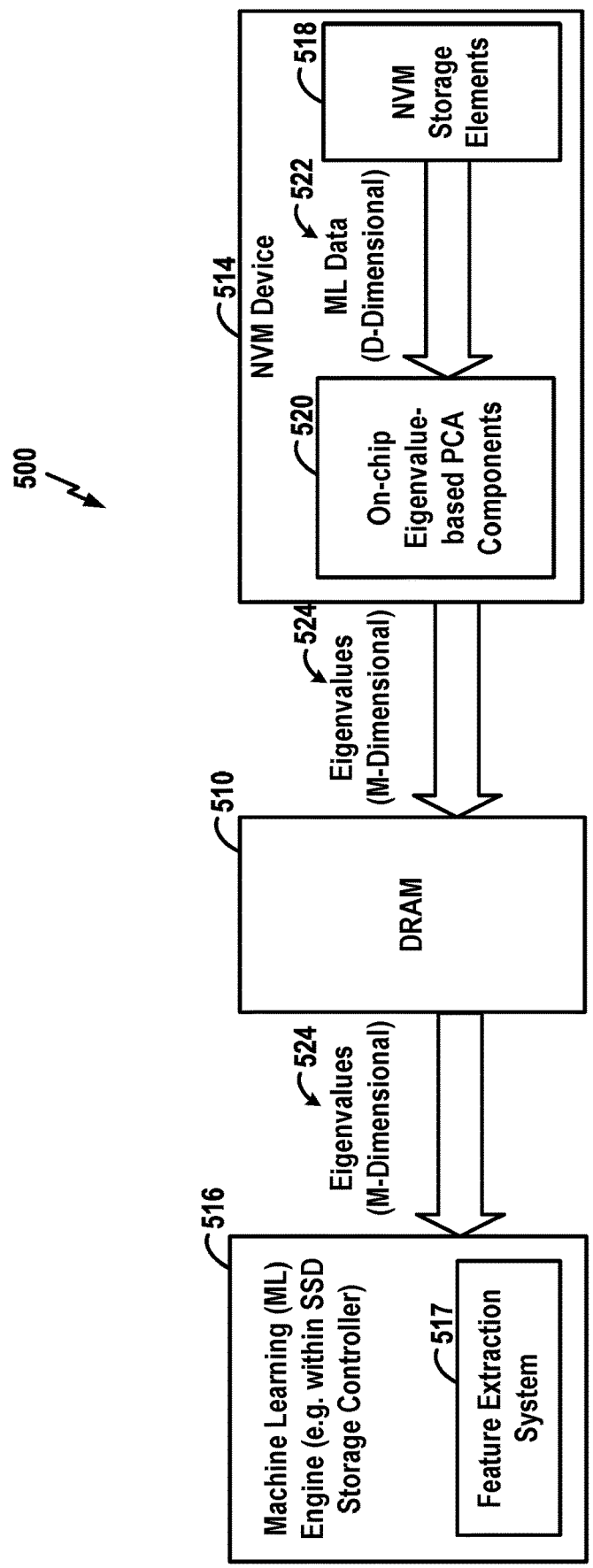
FIG. 5 is a schematic block diagram illustrating an exemplary SSD with an NVM device equipped with on-chip PCA components, where the PCA components are configured to generate eigenvalues without eigenvectors.

FIG. 5 is a block diagram illustrating selected components of an exemplary SSD 500 having an NVM device that outputs eigenvalues without outputting any corresponding eigenvectors. The SSD 500 again includes a machine learning engine 516, a DRAM 510, and an NVM device 514 (which may comprise one or more dies). The NVM device 514 again includes NVM storage elements 518 and on-chip PCA components 520. In the example of FIG. 5, a set of ML data with dimension D is again stored within the NVM storage elements 518. The D-dimensional data 522 is transferred from the NVM storage elements 518 to the PCA components 520, which perform PCA operations to convert the input D-dimensional data 522 into M-dimensional data 524.

In the particular example of FIG. 5, the machine learning engine 516 is configured to perform machine learning based on eigenvalues without the need for eigenvectors. This also may be regarded as a form of feature extraction, and the machine learning engine 516 is shown to include a feature extraction system 517. The PCA components 520 are configured to generate and output eigenvalues based on D-dimensional ML data. Any eigenvectors generated as part of the PCA procedure are not output from the NVM device 514 to the machine learning engine 516. In the example of FIG. 5, the M-dimensional ML data 524 (consisting of the eigenvalues but not eigenvectors) is transferred from the NVM device 514 into the DRAM 510, where it is stored and then accessed as needed by the machine learning engine 516 and its feature extraction system 517. Although not shown in FIG. 5, the machine learning engine 516 and its feature extraction system 517 may output data such as such as synaptic weights or the like.

Figure 6:
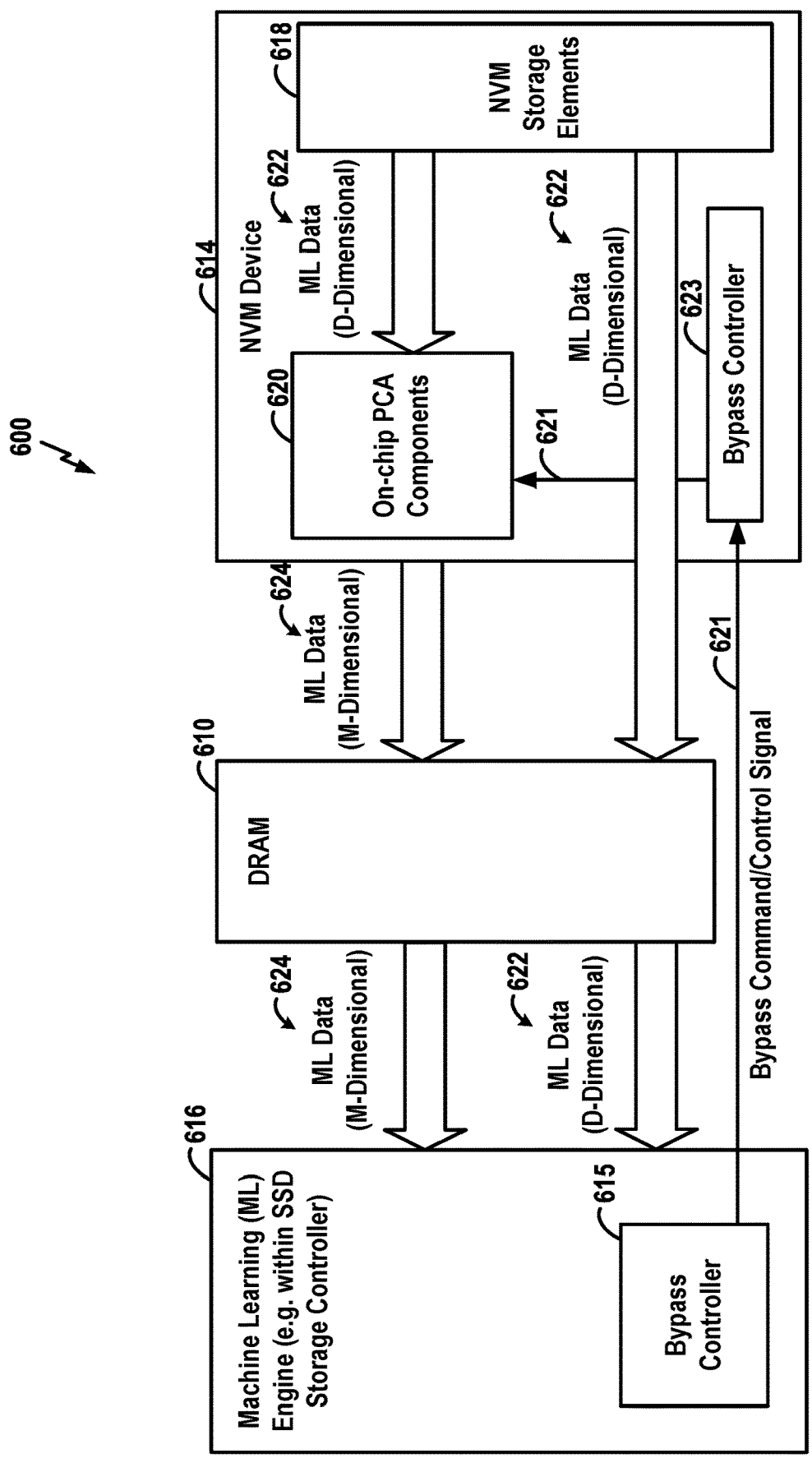
FIG. 6 is a schematic block diagram illustrating an exemplary SSD with an NVM device equipped with on-chip PCA components, where the NVM device includes PCA bypass components.

FIG. 6 is a block diagram illustrating selected components of an exemplary SSD 600 having an NVM device that includes components configured for PCA bypass. The SSD 600 again includes a machine learning engine 616, a DRAM 610, and an NVM device 614 (which may comprise one or more dies). In this example, the machine learning engine 616 includes a bypass controller 615 for selectively controlling the NVM device 614 to bypass at least some of its on-chip PCA components. The NVM device or die 614 again includes NVM storage elements 618 and PCA components 620. In the example of FIG. 6, a set of ML data with dimension D is again stored within the NVM storage elements 618. Assuming that PCA operations are not bypassed, the D-dimensional data 622 is transferred from the NVM storage elements 618 to the PCA components 620, which perform various PCA operations to convert the data to M-dimensional data 624 representative of the principal components of the data. The M-dimensional ML data 624 is transferred from the NVM device 614 into the DRAM 610, where it is stored and then accessed as needed by the machine learning engine 616. However, if the PCA components 620 of the NVM device 618 are instead bypassed (as may be indicated by a suitable bypass command/control signal 621 sent from bypass controller 615 to the NVM device 614), the D-dimensional ML data 622 is transferred to the DRAM 610 and then to the machine learning engine 616. This allows the machine learning engine 616 to use the D-dimensional data. In other examples, the command signal 621 may be used to control the amount of PCA that is performed by the on-chip PCA components 620 to, for example, control the amount of dimensional reduction that is achieved by, for example, specifying the value of M to be achieved.

Figure 7:
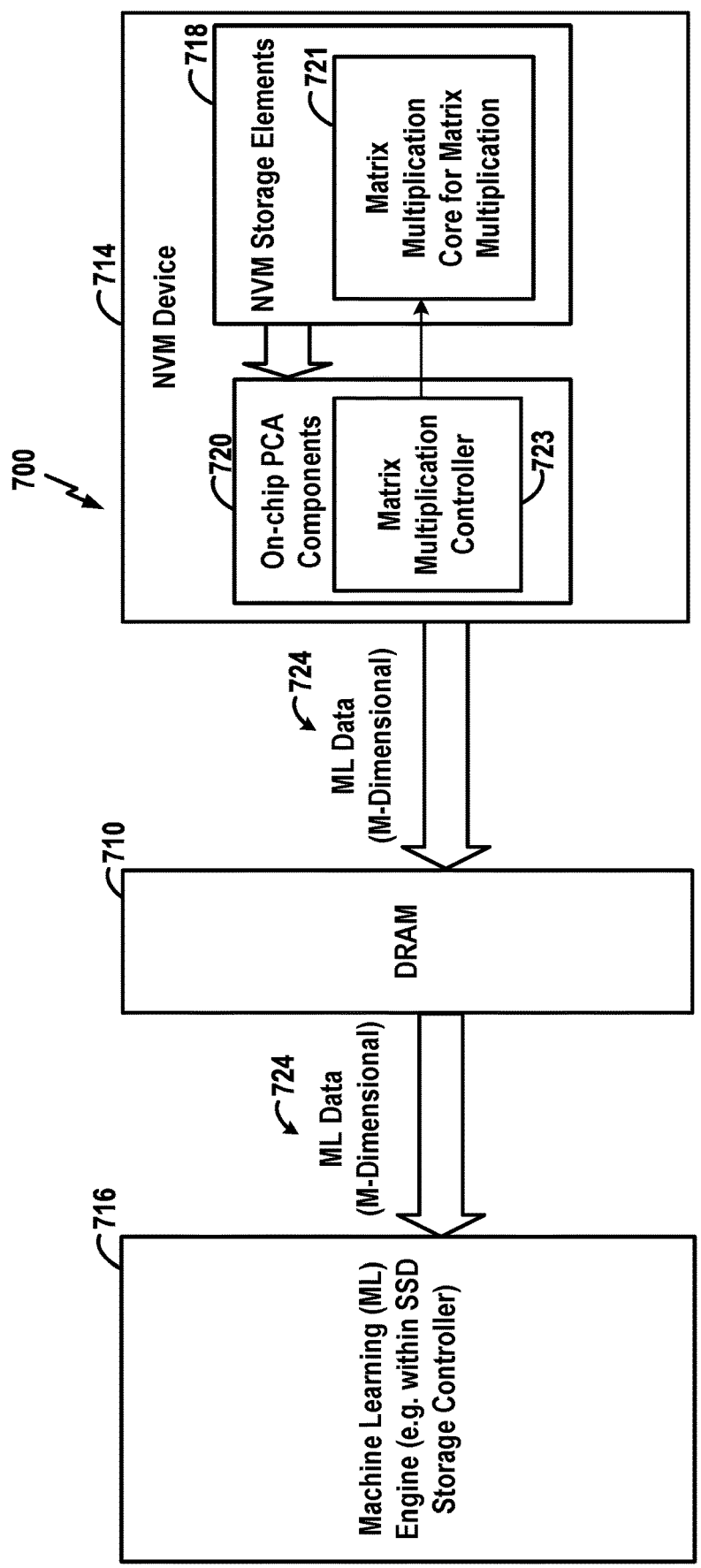
FIG. 7 is a schematic block diagram illustrating an exemplary SSD with an NVM device equipped with on-chip PCA components, where the PCA components include a matrix multiplication core configured for matrix multiplication.

FIG. 7 is a block diagram illustrating selected components of an exemplary SSD 700 having an NVM device that includes storage array components configured for matrix multiplication. The SSD 700 again includes machine learning engine 716, a DRAM 710, and an NVM device 714 (which may comprise one or more dies). The NVM device 714 again includes NVM storage elements 718 and PCA components 720. In this example, a portion of the NVM storage elements 718 is configured as a matrix multiplication core 721 for directly performing matrix multiplication operations (such as covariance matrix computations). A controller 723 within the PCA components 720 controls the operation of the matrix multiplication core 721. ML data with dimension D is processed by the PCA components 720 and the matrix multiplication core 721 (under the control of the matrix multiplication controller 723) to convert the D-dimensional data to M-dimensional data 724. Note that, depending upon the implementation, the matrix multiplication core of storage array 721 may have suitable weight values for PCA already stored therein or those values may be obtained from other NVM elements 718. Since at least some of the PCA operations are performed by the matrix multiplication core of the NVM storage array 721, it may possible (depending on the particular configuration of the PCA components 720) to use fewer or smaller page buffers during the PCA operations. As with the preceding examples, the resulting M-dimensional ML data 724 is transferred from the NVM device 714 into the DRAM 710, where it is stored and then accessed as needed by the machine learning engine 716.

Figure 8:
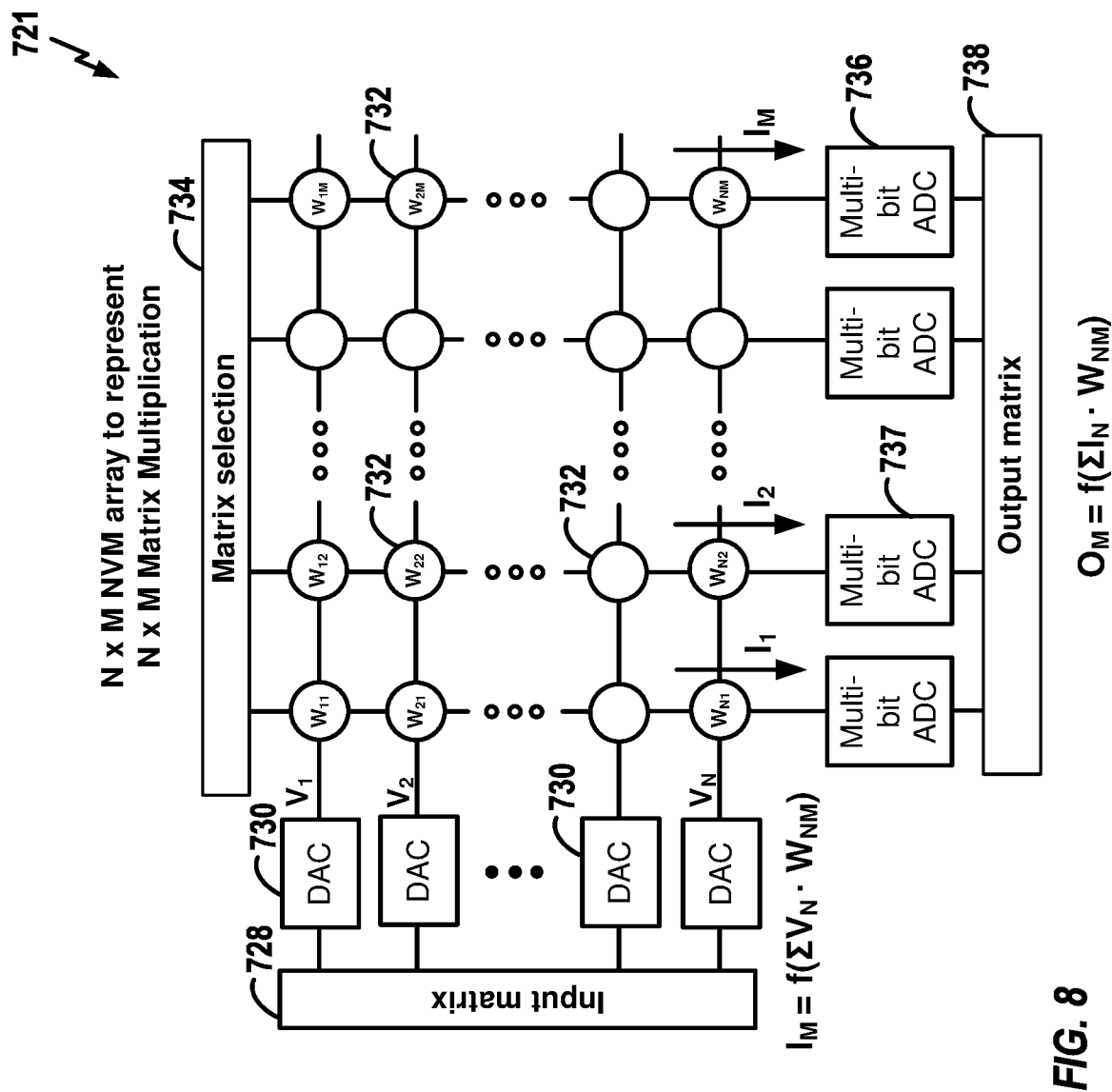
FIG. 8 is a schematic block diagram illustrating an exemplary matrix multiplication core for use in the NVM device of FIG. 7.
Figure 8:
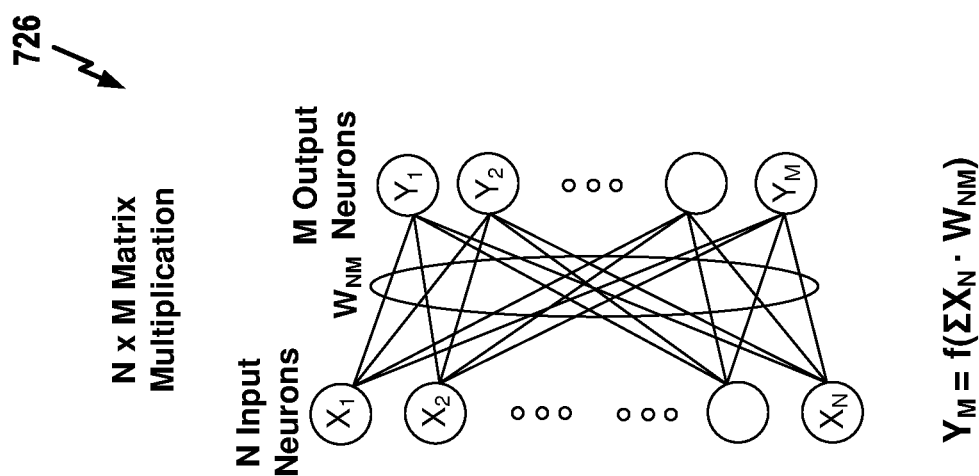

FIG. 8 illustrates an exemplary configuration for the NVM storage array 721 of FIG. 7 for performing matrix multiplications. FIG. 8 also illustrates exemplary N×M matrix multiplication operations 726 that may be performed by the NVM storage array 721 (for use as part of a PCA procedure to determine principal components or for other purposes). In the example of FIG. 8, the operations correspond to computing $Y_M=f(\Sigma X_N \cdot W_{NM})$ for a set of N input neurons ($X_n$) to generate M output neurons ($Y_n$) where the neurons may be elements of a DNN and where $W_{nm}$ represents precomputed weights of a neural network of a DNN. The NVM storage array 721 for computing the matrix operations include an input component 728 for inputting an input matrix I where $I_M=f(\Sigma V_N \cdot W_{NM})$, i.e. the I of array 712 corresponds to the X of 726. Individual elements (digital values) of the input matrix are applied to digital-to-analog converters (DAC) 730 to generate analog voltage values ($V_1 \ldots _N$), which are then applied to individual storage elements 732 of the array, which are configured to represent individual weights ($W_{nm}$) of the weight matrix ($W_{NM}$). As shown, each separate voltage value ($V_n$) correspond to the input matrix I is applied to a row of the storage elements 732. A matrix selection component 734 applies control signals to the various columns of storage elements 732 of the array so that, collectively, the elements of the array compute an output matrix $O_M=f(\Sigma I_N \cdot W_{NM})$, where O corresponds to the Y of 726.

FIG. 8 illustrates an exemplary configuration for the NVM storage array 721 of FIG. 7 for performing matrix multiplications. FIG. 8 also illustrates exemplary N×M matrix multiplication operations 726 that may be performed by the NVM storage array 721 (for use as part of a PCA procedure to determine principal components or for other purposes). In the example of FIG. 8, the operations correspond to computing $Y_M=f(\Sigma X_N \cdot W_{NM})$ for a set of N input neurons ($X_n$) to generate M output neurons ($Y_n$) where the neurons may be elements of a DNN and where $W_{nm}$ represents precomputed weights of a neural network of a DNN. The NVM storage array 721 for computing the matrix operations include an input component 728 for inputting an input matrix I where $I_M=f(\Sigma V_N \cdot W_{NM})$, i.e. the I of array 712 corresponds to the X of 726. Individual elements (digital values) of the input matrix are applied to digital-to-analog converters (DAC) 730 to generate analog voltage values ($V_1 \ldots _N$), which are then applied to individual storage elements 732 of the array, which are configured to represent individual weights ($W_{nm}$) of the weight matrix ($W_{NM}$). As shown, each separate voltage value ($V_n$) corresponds to the input matrix I is applied to a row of the storage elements 732. A matrix selection component 734 applies control signals to the various columns of storage elements 732 of the array so that, collectively, the elements of the array compute an output matrix $O_M=f(\Sigma I_N \cdot W_{NM})$, where O corresponds to the Y of 726.

Figure 9:
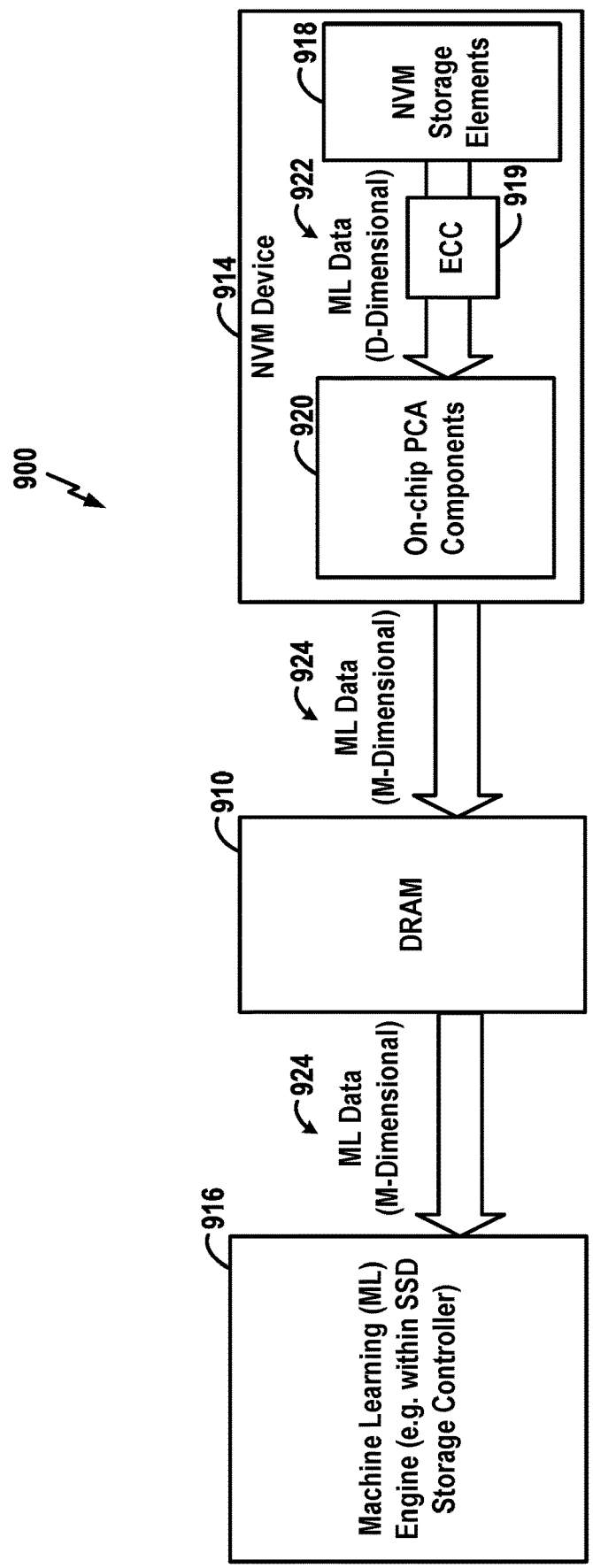
FIG. 9 is a schematic block diagram illustrating an exemplary SSD with an NVM device equipped with on-chip PCA components, where the NVM device applies error correction codes (ECC) to data before the data is applied to the PCA components.

FIG. 9 is a block diagram illustrating selected components of an exemplary SSD 900 where the NVM device includes ECC components for performing error detection and correction on D-dimensional data before PCA processing of the data. The SSD 900 includes a machine learning engine 916, a DRAM 910, and an NVM device 914 (which may comprise one or more dies). The NVM device 914 again includes NVM storage elements 918 and PCA components 920. The NVM device 914 also includes an ECC component 919. In the example of FIG. 9, ML data with dimension D is stored within the NVM storage elements 918. The ML D-dimensional data 922 is transferred from the NVM storage elements 918 to the ECC component 919, which applies error correction codes to correct errors in the ML D-dimensional data. The error-corrected ML D-dimensional data 922 is transferred to the PCA components 920, which perform PCA operations to determine the principal components of the data, which may be represented as M-dimensional data 924. The M-dimensional ML data 924 is transferred from the NVM device 914 into the DRAM 910, where it is stored and then accessed as needed by the machine learning engine 916 to perform initial training. Although not shown in FIG. 9, the machine learning engine 916 may output data to other components of the SSD 900 or to a host (not shown). The output data again may include, for example, values representative of a trained DNN, such as synaptic weights or the like.

Figure 10:
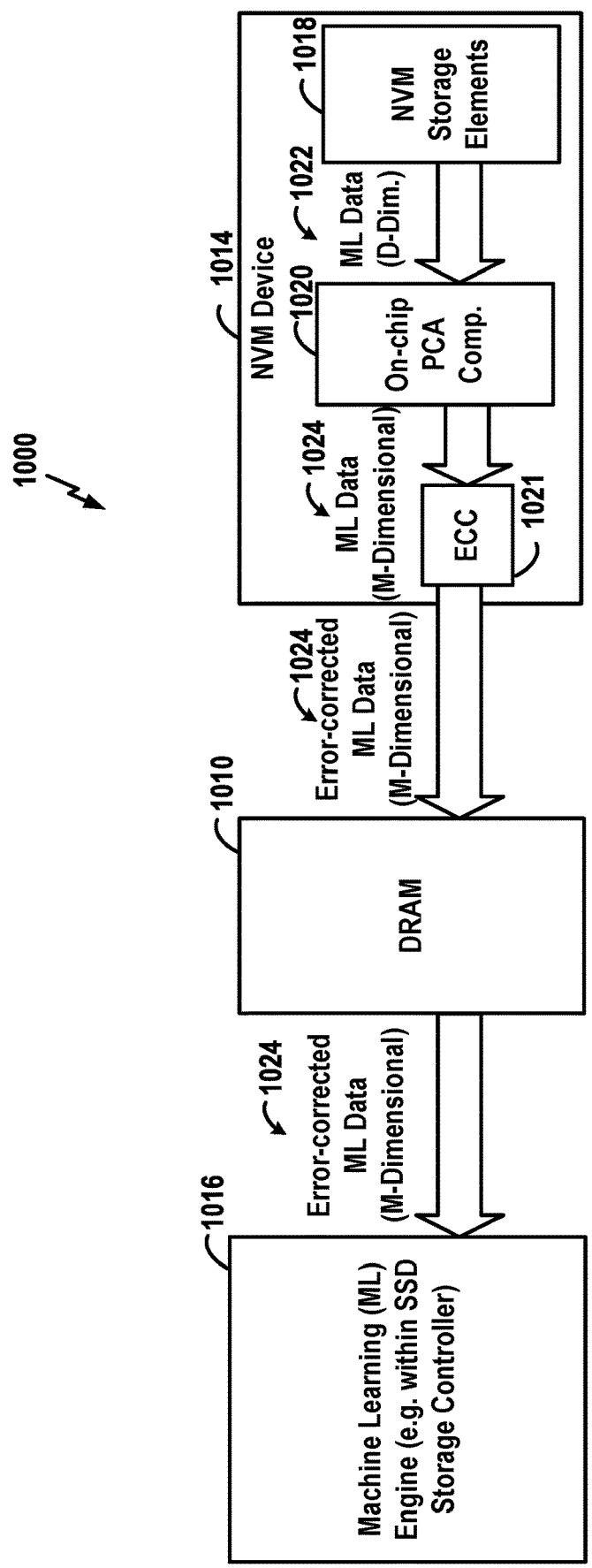
FIG. 10 is a schematic block diagram illustrating an exemplary SSD with an NVM device equipped with on-chip PCA components, where the NVM device applies ECC to principal component data generated by the PCA components before the data is output from the NVM device.

FIG. 10 is a block diagram illustrating selected components of an exemplary SSD 1000 where the NVM device includes ECC components for performing error detection and correction on the M-dimensional data after PCA processing. The SSD 1000 again includes a machine learning engine 1016, a DRAM 1010, and an NVM device 1014 (which may comprise one or more dies). The NVM device or die 1014 includes NVM storage elements 1018, PCA components 1020, and an ECC component 1021. In the example of FIG. 10, ML data with dimension D is stored within the NVM storage elements 1018. Uncorrected ML D-dimensional data 1022 is transferred from the NVM storage elements 1018 to the PCA components 1020, which perform PCA operations to determine the principal components of the data, which may be represented as M-dimensional data 1024. The ML M-dimensional data 1024 is then processed by the ECC component 1021, which applies error correction codes to correct errors in the ML M-dimensional data. The error-corrected ML M-dimensional data 1024 is transferred from the NVM device 1014 to the DRAM 1010, where it is stored and then accessed as needed by the machine learning engine 1016 to perform initial training.

Figure 11:
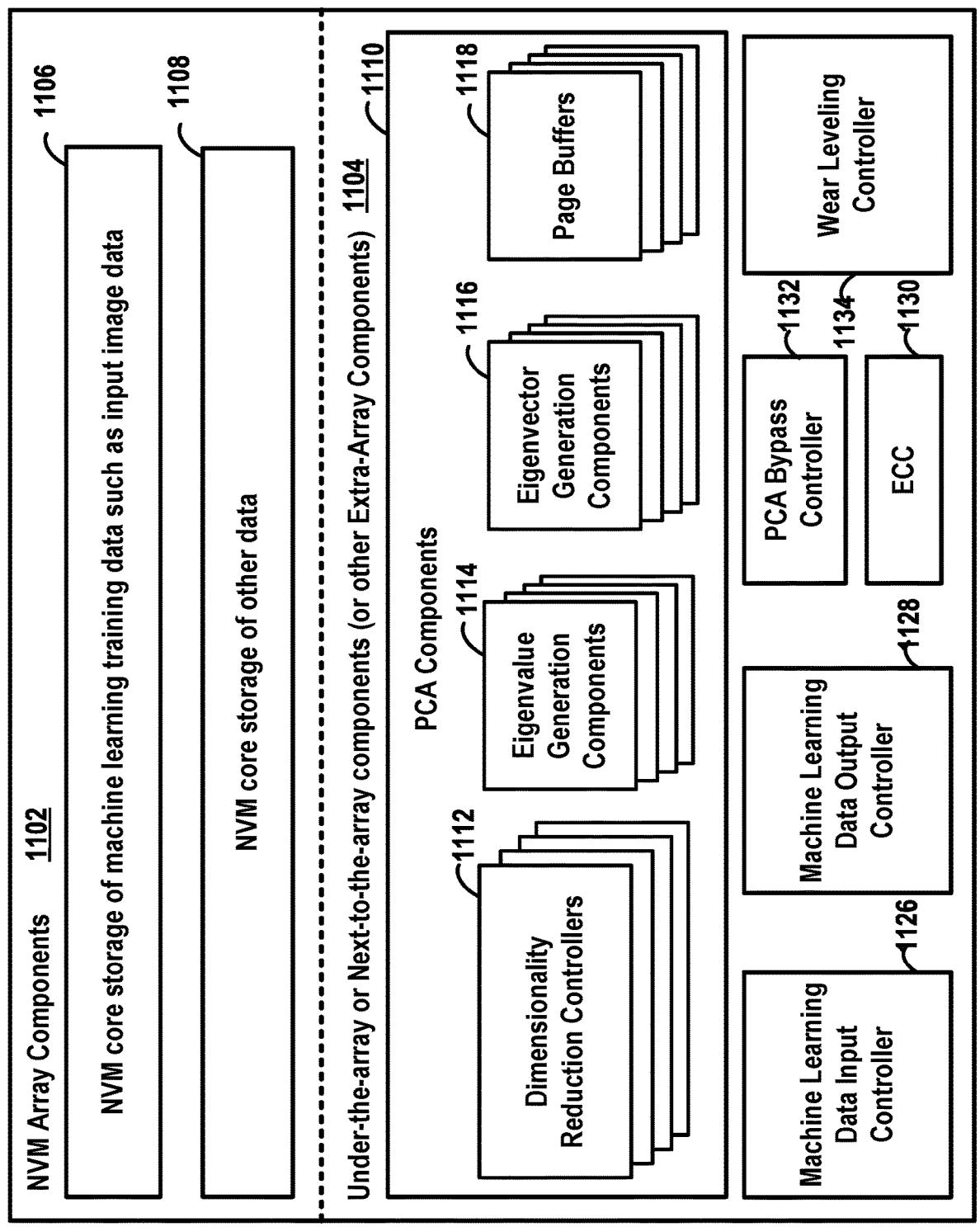
FIG. 11 illustrates an example of an NVM die having various on-chip under-the-array or next-to-the-array components configured for PCA.

FIG. 11 is a block diagram of an exemplary NVM die 1100 that includes NVM storage array components 1102 and under-the-array or next-to-the-array (or other extra-array) processing components 1104 for performing PCA and other functions. Not all circuit or memory components that might be used in a practical NVM die are illustrated in the figure, such as input and output components, voltage regulation components, clocks and timing components, etc. Rather selected components and circuits are shown, summarized as block or schematic diagrams. The exemplary NVM array components 1102 include: NVM storage 1106 for storing machine learning training data such as input image data; and NVM storage 1108 configured for storing other data such as DNN synaptic weights, bias values, etc., or other types of user data or system data.

The NVM extra-array processing components 1104 include various PCA components 1110 configured to perform or control PCA operations. In the example of FIG. 11, the exemplary PCA components 1110 include: one or more dimensionality reduction controllers 1112 configured to control PCA operations to reduce a dimensionality of the input image data from D to M where D>>M (and where M can be selected or otherwise controlled); one or more eigenvalue generation components 1114 configured to determine or generate eigenvalues from the input data; one or more eigenvector generation components 1116 configured to determine or generate eigenvalues from the input data; and one or more page buffers 1118 configured to store intermediate data. In examples, some of these components may be replaced by or supplemented by a matrix multiplication core (shown in FIG. 8 and discussed above).

Multiple instances of each of the individual PCA components (1112, 1114, 1116, and 1118) are shown since, in some examples, a plurality of such components may operate in parallel. For example, N PCA components 1110 may be provided to concurrently process N different input training images to expedite PCA processing. In other examples, only a single instance of each component may be provided. In yet other examples, other PCA components are additionally or alternatively provided, which serve to perform additional or alternative PCA procedures.

The NVM extra-array processing components 1104 of FIG. 11 also include various other components including: a machine learning data input controller 1126 configured to input and store machine learning training data in the NVM storage 1106; a machine learning data output controller 1128 configured to output principal component data (such as eigenvalues and eigenvectors) and other data as may be appropriate (such as synaptic weights) depending on the particular PCA procedure being implemented and the particular the DNN for use with the machine learning data; and an on-chip ECC component 1130 configured to control any on-chip ECC applied to data as it is read from the NVM array components 1102 (and/or after it has been processed by the PCA components). A PCA bypass controller 1132 is provided, which operates as discussed above to selectively bypass PCA so D-dimensional data may be output. A wear leveling controller 1134 performs wear leveling of data stored in the NVM device 1100.

As noted above, a "Read with PCA" command may be enabled for reading out data from the NVM device 1100 while performing PCA. In response to the command, the data may be read out of the NVM core storage 1106 using page reads and stored in the page buffers 1118 for PCA processing. This is summarized in the next figure.

Figure 12:
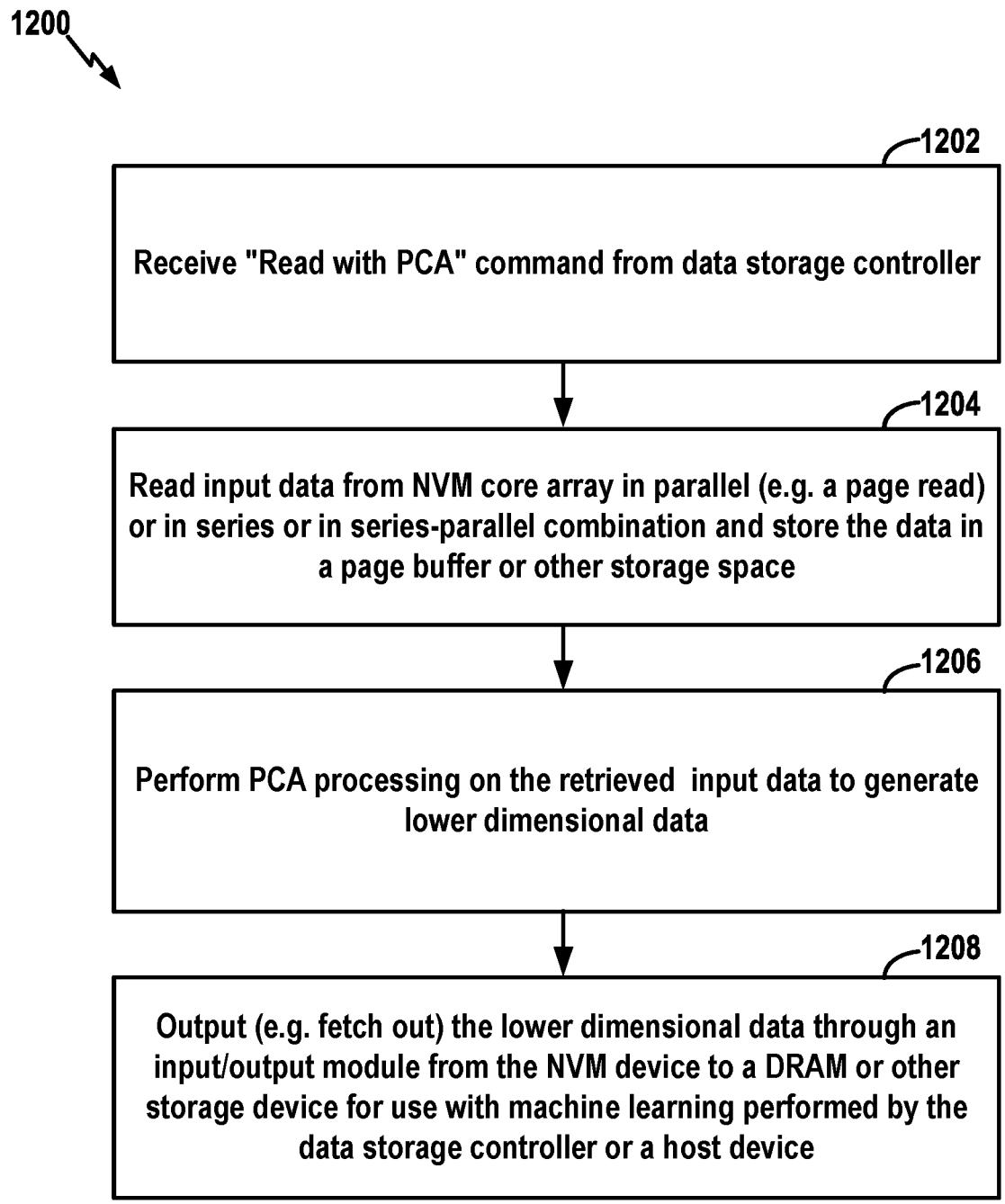
FIG. 12 illustrates a flow chart of an exemplary method according to aspects of the present disclosure for implementing a "Read with PCA" command.

FIG. 12 summarizes an example of processing by an NVM device in response to a received "Read with PCA" command. At 1202, the NVM device receives the "Read with PCA" command from a data storage controller (e.g., controller 108 in FIG. 1). At 1204, the NVM device reads input data from NVM core array in parallel (e.g., a page read) or in series or in series-parallel combination and stores the data in a page buffer or other storage space. (Here, again, the data is referred to as input data since it is meant for input into a machine learning system for training purposes or other purposes.) At 1206, the NVM device performs PCA processing on the retrieved input data to generate lower dimensional data, i.e. data of lower dimensionality than the input data. At 1208, the NVM device outputs (e.g. fetches out) the lower dimensional data through an input/output module from the NVM device to a DRAM or other storage device for use with machine learning, where the machine learning may be performed by the data storage controller or a host device.

In the following, various general exemplary procedures and systems are described.

Additional Exemplary Methods and Apparatus

Figure 13:
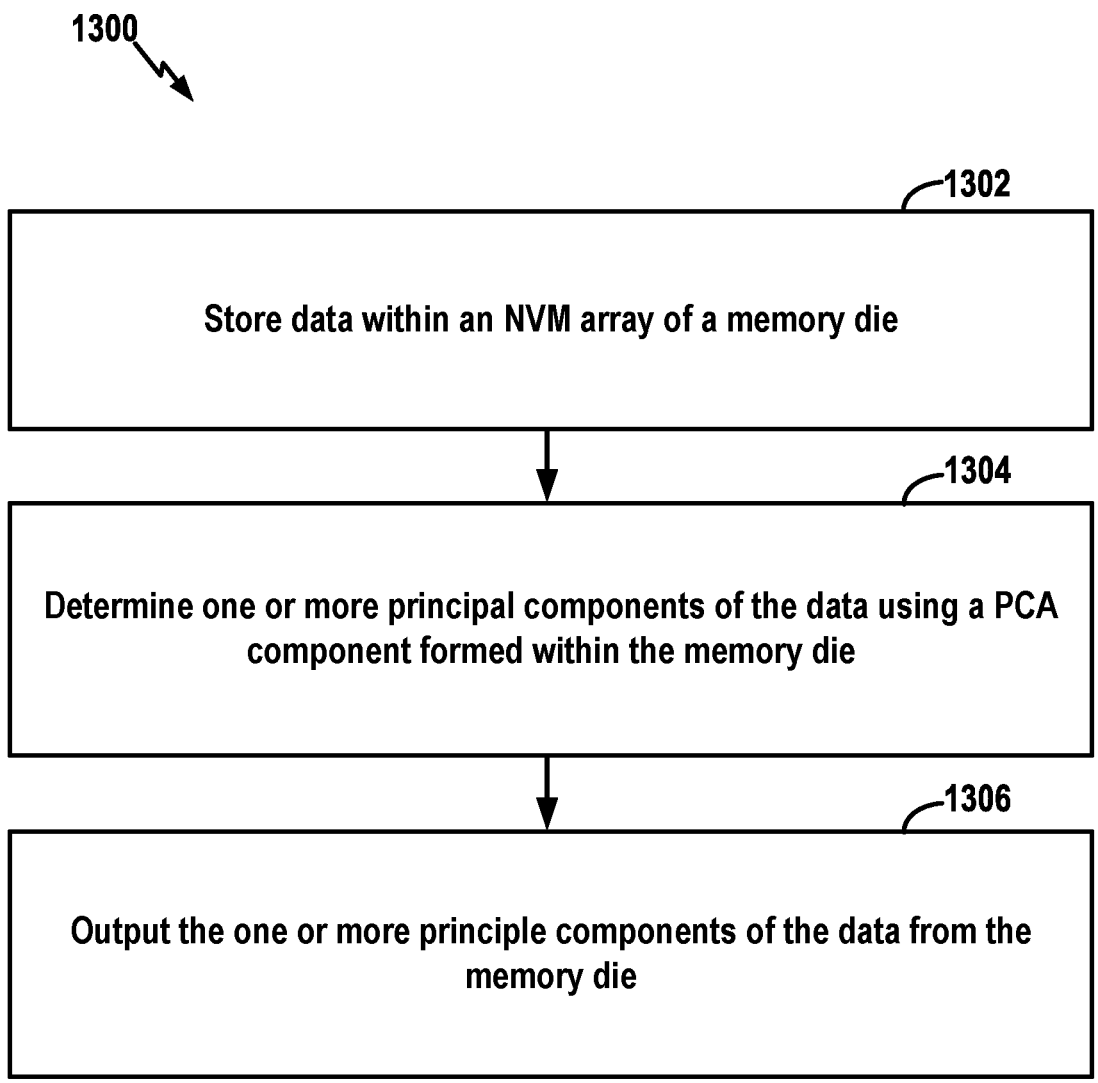
FIG. 13 is a flow chart that summarizes exemplary operations performed by a die having an NVM array and a PCA component.

FIG. 13 broadly illustrates a process 1300 in accordance with aspects of the disclosure. The process 1300 may take place within any suitable memory die with an NVM array where the die is capable of performing the operations, such as a memory die provided with under-the-array circuitry coupled to a NAND array. At block 1302, the memory die stores data (such as training data for machine learning) within its NVM array. At 1304, the memory die determines one or more principal components of the data using a PCA component formed within the die. For example, under-the-array circuitry formed in the memory die may apply the data to under-the-array PCA components to generate PCA output data where the PCA output data comprises the principal components. As noted above, PCA output data may include eigenvalues and eigenvectors. At 1306, the memory die outputs the one or more principal components of the data. The data may be output, for example, to a data storage controller of an SSD (of which the memory die is a component or is operationally coupled to).

Figure 14:
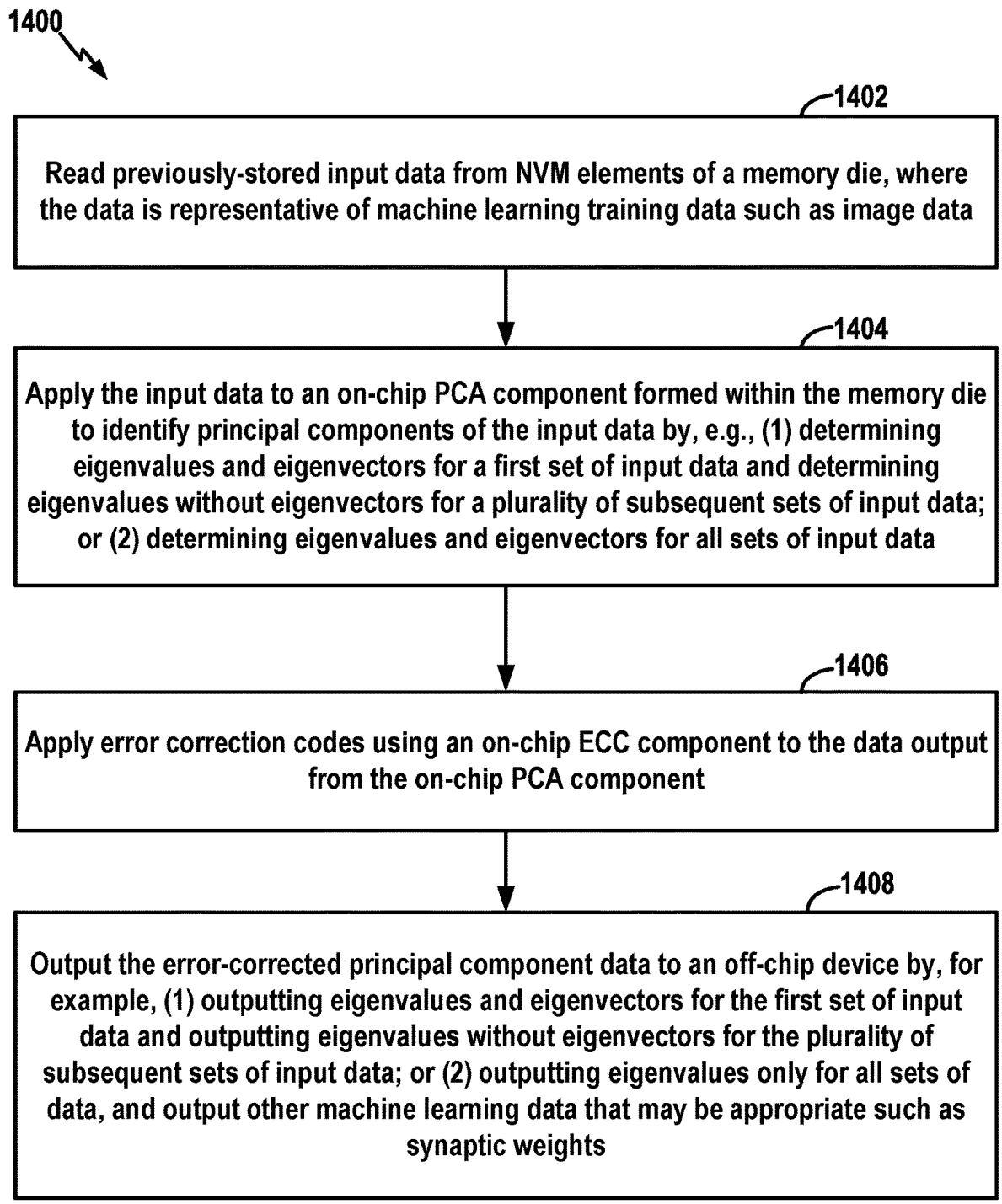
FIG. 14 is a flow chart that summarizes additional exemplary operations performed by the die with the PCA component, including ECC operations applied to PCA output data.

FIG. 14 broadly illustrates a process 1400 in accordance with other aspects of the disclosure, where error correction codes are applied after PCA. The process 1400 may take place within any suitable memory die capable of performing the operations. At block 1402, the memory die reads previously-stored input data from NVM elements of the die, where the data is representative of machine learning training data such as image data. At block 1404, the memory die applies the input data to an on-chip PCA component formed within the memory die to identify principal components of the input data by, for example, (1) determining eigenvalues and eigenvectors for a first set of input data and determining eigenvalues without eigenvectors for a plurality of subsequent sets of input data; or (2) determining eigenvalues and eigenvectors for all sets of input data. At block 1404, the memory die applies error correction codes using an on-chip ECC component to the data output from the PCA component. At block 1406, the memory die outputs the error-corrected principal component data to an off-chip device by, for example, (1) outputting eigenvalues and eigenvectors for the first set of input data and outputting eigenvalues without eigenvectors for the plurality of subsequent sets of input data; or (2) outputting eigenvalues only for all sets of data, and outputting other machine learning data that may be appropriate such as synaptic weights.

Figure 15:
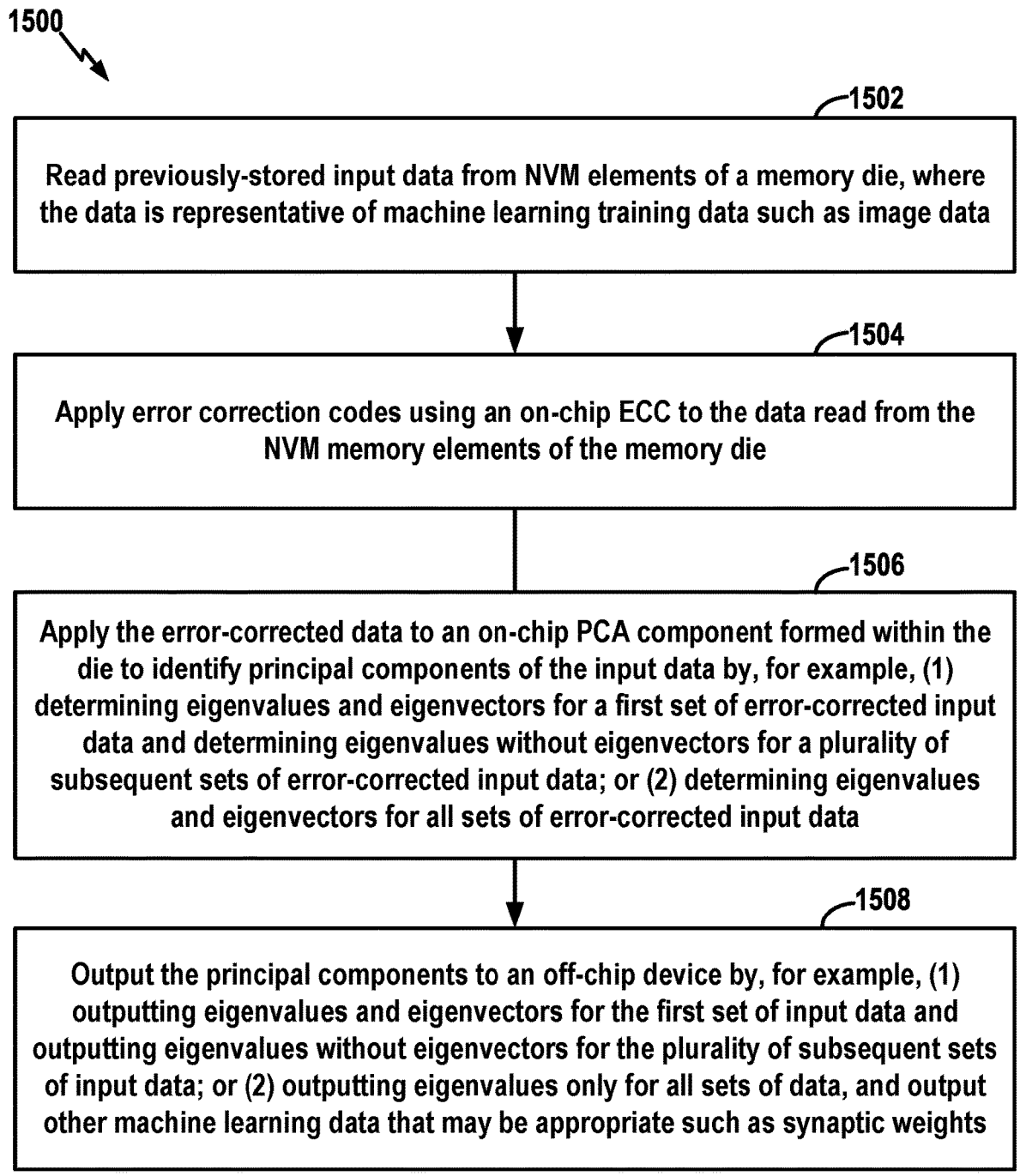
FIG. 15 is a flow chart that summarizes additional exemplary operations performed by the die with the PCA component, including ECC operations applied to machine learning input data before the data is applied to the PCA component.

FIG. 15 broadly illustrates a process 1500 in accordance with still other aspects of the disclosure, where error correction codes are applied before PCA. The process 1500 may take place within any suitable memory die capable of performing the operations. At block 1502, the memory die reads previously-stored input data from NVM elements of the NVM die, where the data is again representative of machine learning training data such as image data. At block 1504, the memory die applies error correction codes using an on-chip ECC to the data read from the NVM memory elements. At block 1504, the memory die applies the error-corrected data to an on-chip PCA component formed within the memory die to identify principal components of the input data by, for example, (1) determining eigenvalues and eigenvectors for a first set of error-corrected input data and determining eigenvalues without eigenvectors for a plurality of subsequent sets of error-corrected input data; or (2) determining eigenvalues and eigenvectors for all sets of error-corrected input data. At block 1506, the memory die outputs the principal components to an off-chip device by, for example, (1) outputting eigenvalues and eigenvectors for the first set of input data and outputting eigenvalues without eigenvectors for the plurality of subsequent sets of input data; or (2) outputting eigenvalues only for all sets of data, and outputting other machine learning data that may be appropriate such as synaptic weights.

Figure 16:
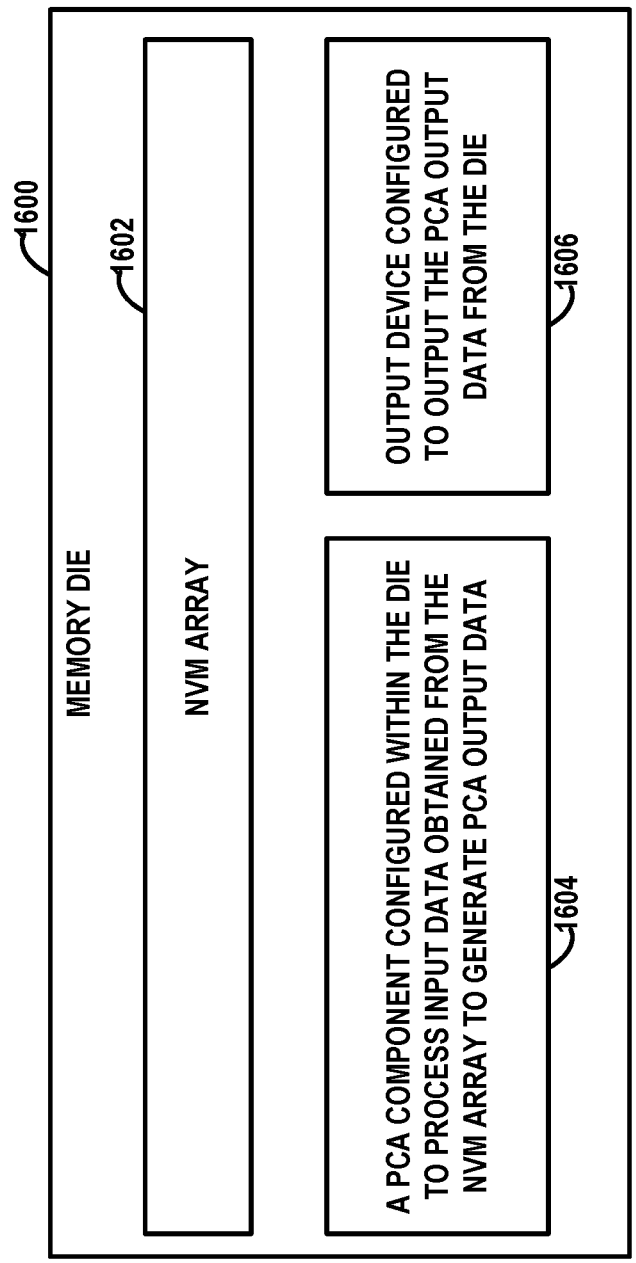
FIG. 16 is a schematic block diagram illustrating an exemplary die having a PCA component and an NVM array.

FIG. 16 broadly illustrates a memory die 1600 configured according to one or more aspects of the disclosure. The memory die 1600 includes an NVM array 1602, such as a NAND or ReRAM array. The memory die also includes a PCA component 1604 configured in the memory die to process input data obtained from the NVM array 1602 to generate PCA output data. The memory die also includes an output device 1606 configured to output the PCA output data from the memory die. The PCA output data may be output, e.g., to a data storage controller of an SSD (of which the memory die is a component or is operationally coupled to). Examples are described above. Additional examples are described below.

Note that many of the components described herein may be devices or circuits configured as a means for performing certain functions. By way of example, an apparatus formed on a memory die may be provided where the memory die has an NVM array and where the apparatus includes: means, such as PCA component 1604 of FIG. 16, for performing PCA on data obtained from the NVM array to determine principal components of the data; and means, such as output device 1606 of FIG. 16, for outputting the principal components of the data from the memory die.

Figure 17:
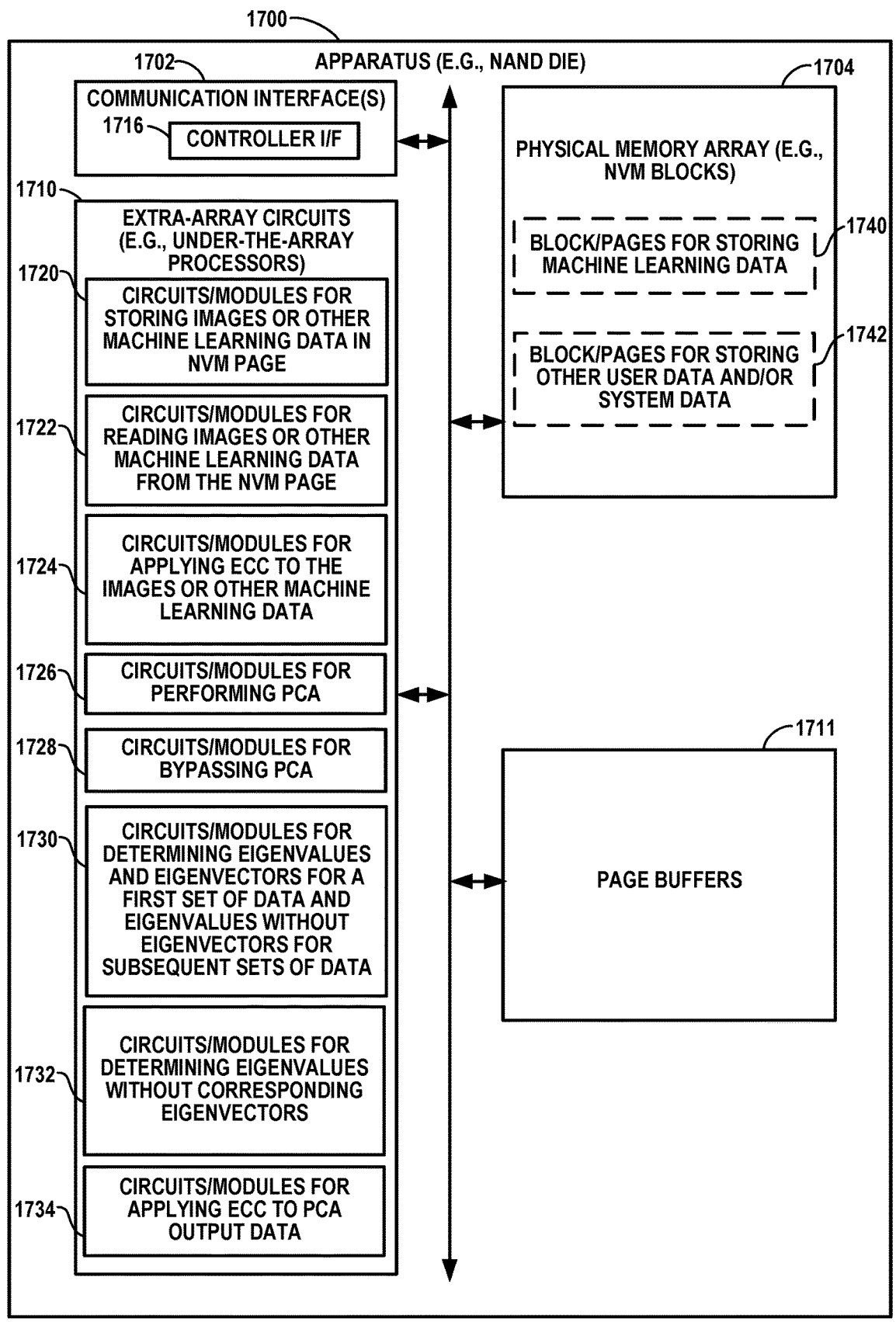
FIG. 17 is a schematic block diagram providing further details of an exemplary NVM die apparatus and its on-chip components.

FIG. 17 illustrates an embodiment of an apparatus 1700 configured according to one or more aspects of the disclosure. The apparatus 1700, or components thereof, could embody or be implemented within a NAND die or some other type of NVM device or memory die that supports data storage. In various implementations, the apparatus 1700, or components thereof, could be a component of a processor, a controller, a computing device, a personal computer, a portable device, or workstation, a server, a personal digital assistant, a digital camera, a digital phone, an entertainment device, a medical device, a self-driving vehicle control device, aerial drone, smart glasses, smart watch or other wearable device, or any other electronic device that stores, processes or uses data.

The apparatus 1700 includes a communication interface 1702, a physical memory array (e.g., NAND blocks or NAND pages) 1704, and extra-array processing circuits 1710 (e.g. under-the-array or next-to-the-array circuits). These components can be coupled to and/or placed in electrical communication with one another via suitable components, represented generally by the connection lines in FIG. 17. Although not shown, other circuits such as timing sources, peripherals, voltage regulators, and power management circuits may be provided, which are well known in the art, and therefore, will not be described any further.

The communication interface 1702 provides a means for communicating with other apparatuses over a transmission medium. In some implementations, the communication interface 1702 includes circuitry and/or programming (e.g., a program) adapted to facilitate the communication of information bi-directionally with respect to one or more devices in a system. In some implementations, the communication interface 1702 may be configured for wire-based communication. For example, the communication interface 1702 could be a bus interface, a send/receive interface, or some other type of signal interface including circuitry for outputting and/or obtaining signals (e.g., outputting signal from and/or receiving signals into an SSD). The communication interface 1702 serves as one example of a means for receiving and/or a means for transmitting.

The physical memory array 1704 may represent one or more NAND blocks or pages. The physical memory array 1704 may be used for storing data such images that are manipulated by the circuits 1710 or some other component of the apparatus 1700. The physical memory array 1704 may be coupled to the circuits 1710 such that the circuits 1710 can read or sense information from, and write or program information to, the physical memory array 1704. That is, the physical memory array 1704 can be coupled to the circuits 1710 so that the physical memory array 1704 is accessible by the circuits 1710. Data may be temporarily stored in one or more page buffers 1711.

The circuits 1710 are arranged or configured to obtain, process and/or send data, control data access and storage, issue or respond to commands, and control other desired operations. For example, the circuits 1710 may be implemented as one or more processors, one or more controllers, and/or other structures configured to perform functions. According to one or more aspects of the disclosure, the circuits 1710 may be adapted to perform any or all of the extra-array features, processes, functions, operations and/or routines described herein. For example, the circuits 1710 may be configured to perform any of the steps, functions, and/or processes described with reference to the other figures. As used herein, the term "adapted" in relation to the processing circuits 1710 may refer to the circuits being one or more of configured, employed, implemented, and/or programmed to perform a particular process, function, operation and/or routine according to various features described herein. The circuits may include a specialized processor, such as an ASIC that serves as a means for (e.g., structure for) carrying out any one of the operations described with reference to the other figures. The circuits serve as an example of a means for processing. In various implementations, the circuits may provide and/or incorporate, at least in part, functionality described above for the on-chip PCA components in various embodiments shown, including for example element 220 of FIG. 2.

According to at least one example of the apparatus 1700, the processing circuit 1710 may include one or more of: circuit/modules 1720 configured for storing images or other machine learning data in NVM pages; circuits/modules 1722 configured for reading images or other machine learning data from NVM pages; circuits/modules 1724 configured for applying ECC to the images or other machine learning data (as they are read out of the NVM blocks); circuits/modules 1726 performing PCA; circuits/modules 1728 configured for bypassing the PCA operations; circuits/modules 1730 configured for determining eigenvalues and eigenvectors for a first set of input data and determining eigenvalues without eigenvectors for subsequent sets of input data; circuits/modules 1732 configured for determining eigenvalues without generating corresponding eigenvectors; and circuits/modules 1734 configured for applying ECC to PCA output data (before the PCA output data is output from the apparatus 1700.

In at least some examples, means may be provided for performing the functions illustrated in FIG. 17 and/or other functions illustrated or described herein. For example, the means may include one or more of: means, such as circuit/modules 1720, for storing images or other machine learning data in the NVM; means, such as circuits/modules 1722, for reading images or other machine learning data from the NVM; means, such as circuits/modules 1724, for applying ECC to the images or other machine learning data; means, such as circuits/modules 1726, for performing PCA; means, such as circuits/modules 1728, for bypassing PCA; means, such as circuits/modules 1730, for determining eigenvalues and eigenvectors for a first set of input data and determining eigenvalues without eigenvectors for subsequent sets of input data; means, such as circuits/modules 1732, for determining eigenvalues without generating corresponding eigenvectors; and means, such as circuits/modules 1734, for applying ECC to PCA output data.

Additional Aspects

At least some of the processing circuits described herein may be generally adapted for processing, including the execution of programming code stored on a storage medium. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

At least some of the processing circuits described herein may be arranged to obtain, process and/or send data, control data access and storage, issue commands, and control other desired operations. The processing circuits may include circuitry configured to implement desired programming provided by appropriate media in at least one example. For example, the processing circuits may be implemented as one or more processors, one or more controllers, and/or other structure configured to execute executable programming. Examples of processing circuits may include a general purpose processor, a digital signal processor (DSP), an ASIC, a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. At least some of the processing circuits may also be implemented as a combination of computing components, such as a combination of a controller and a microprocessor, a number of microprocessors, one or more microprocessors in conjunction with an ASIC and a microprocessor, or any other number of varying configurations. The various examples of processing circuits noted herein are for illustration and other suitable configurations within the scope of the disclosure are also contemplated.

Aspects of the subject matter described herein can be implemented in any suitable NVM, including NAND flash memory such as 3D NAND flash memory. More generally, semiconductor memory devices include working memory devices, such as DRAM or SRAM devices, NVM devices, ReRAM, EEPROM, flash memory (which can also be considered a subset of EEPROM), ferroelectric random access memory (FRAM), and MRAM, and other semiconductor elements capable of storing information. Each type of memory device may have different configurations. For example, flash memory devices may be configured in a NAND or a NOR configuration. As noted, some features described herein are specific to NAND-based devices, such as the NAND-based on-chip copy with update.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two dimensional and three dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "In communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" is intended to cover A, B, C, A-B, A-C, B-C, and A-B-C, as well as multiples of the same members (e.g., any lists that include AA, BB, or CC). Likewise, "at least one of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A memory die comprising:
   a non-volatile memory (NVM) array;
   a principal component analysis (PCA) circuit configured in the memory die to process image recognition training data obtained from the NVM array to generate PCA output data representative of principal components of the image recognition training data, wherein the PCA circuit comprises a matrix multiplication core formed within a portion of the NVM array; and
   an output device configured to output the PCA output data from the memory die.

2. The memory die of claim 1, wherein the PCA circuit is configured to generate the PCA output data to have a lower dimensionality than a dimensionality of the image recognition training data.

3. The memory die of claim 1, wherein the PCA circuit is further configured to generate the PCA output data by generating eigenvalues and eigenvectors, and wherein the output device is further configured to output eigenvalues and eigenvectors for a first set of the image recognition training data and to output eigenvalues without eigenvectors for a plurality of subsequent sets of the image recognition training data.

4. The memory die of claim 1, further comprising bypass circuitry configured to bypass the PCA component and control the output device to output the image recognition training data stored in the NVM array rather than output the PCA output data.

5. The memory die of claim 1, further comprising an error correction code (ECC) circuit configured to apply ECC to the image recognition training data before the image recognition training data is processed by the PCA circuit.

6. The memory die of claim 1, further comprising an error correction code (ECC) circuit configured to apply ECC to the PCA output data before the PCA output data is output from the memory die by the output device.

7. The memory die of claim 1, wherein the output device of the memory die is configured to output the PCA output data to a data storage device (DSD) controller.

8. The memory die of claim 1, wherein the NVM array comprises one or more of NAND storage elements, phase-change memory (PCM) elements, magneto-resistive random access memory (MRAM) elements and resistive random access memory (ReRAM) elements.

9. The memory die of claim 1, wherein the image recognition training data comprises labeled images that are labeled to train an image recognition system.

10. A method for use by a memory die comprising a non-volatile memory (NVM) array, the method comprising:
    obtaining image recognition training data from the NVM array;
    determining principal components of the image recognition training data using a principal component analysis (PCA) circuit formed within the memory die, wherein the PCA circuit comprises a matrix multiplication core formed within a portion of the NVM array; and
    outputting the principal components of the data from the memory die.

11. The method of claim 10, wherein determining the principal components comprises determining eigenvalues and eigenvectors, and wherein outputting the principal components of the data comprises outputting eigenvalues and eigenvectors for a first set of the image recognition training data and outputting eigenvalues without eigenvectors for a plurality of subsequent sets of the image recognition training data.

12. The method of claim 10, further comprising receiving a bypass signal and, in response to the bypass signal, outputting the image recognition training data from the memory die rather than outputting the principal components.

13. The method of claim 10, wherein determining the principal components comprises:
    storing at least some of the image recognition training data in a page buffer of the memory die; and
    determining the principal components of the image recognition training data by performing PCA operations on the image recognition training data in the page buffer.

14. The method of claim 10, further comprising applying an error correction code (ECC) to the image recognition training data before determining the principal components.

15. The method of claim 10, further comprising applying an error correction code (ECC) to the principal components before outputting the principal components from the memory die.

16. The method of claim 10, wherein the image recognition training data comprises labeled images that are labeled to train an image recognition system.

17. The method of claim 10, wherein determining the principal components of the image recognition training data comprises generating PCA output data that has a lower dimensionality than a dimensionality of the image recognition training data.

18. An apparatus comprising:
    means, formed on a memory die having a non-volatile memory (NVM) array, for performing principal component analysis (PCA) on image recognition training data obtained from the NVM array to determine values representative of principal components of the image recognition training data, wherein the means for performing PCA comprises a matrix multiplication core formed within a portion of the NVM array; and
    means, formed on the memory die, for outputting the principal components of the data from the memory die.

19. The apparatus of claim 18, wherein the means for performing PCA further comprises means for determining eigenvalues and eigenvectors and wherein the means for outputting comprises means for outputting eigenvalues and eigenvectors for a first set of the image recognition training data and means for outputting eigenvalues without eigenvectors for a plurality of subsequent sets of the image recognition training data.

20. A data storage device comprising:
    a storage device controller;
    a plurality of memory dies;
    wherein at least one of the memory dies comprises:
        a non-volatile memory (NVM) array;
        a principal component analysis (PCA) circuit in the at least one of the memory dies and configured to process image recognition training data obtained from the NVM array to generate PCA output data representative of principal components of the image recognition training data, wherein the PCA circuit comprises a matrix multiplication core formed within a portion of the NVM array; and
        an output device configured to output the PCA output data to the storage device controller.

21. The data storage device of claim 20, wherein the PCA circuit is further configured to generate the PCA output data by generating eigenvalues and eigenvectors and wherein the output device is further configured to output eigenvalues and eigenvectors for a first set of the image recognition training data and to output eigenvalues without eigenvectors for a plurality of subsequent sets of the image recognition training data.

22. The data storage device of claim 20, further comprising an error correction code (ECC) circuit configured to apply ECC to the image recognition training data before the image recognition training data is processed by the PCA circuit.

23. The data storage device of claim 20:
    wherein the storage device controller is configured to generate at least one Read command to obtain the image recognition training data from the NVM array while bypassing the PCA circuit; and
    wherein the storage device controller is further configured to generate at least one Read with PCA command to obtain the PCA output data processed by the PCA circuit.

24. The data storage device of claim 20, wherein the image recognition training data comprises labeled images that are labeled to train an image recognition system.

* * * * *